US005515378A

United States Patent [19]
Roy, III et al.

[11] Patent Number: 5,515,378
[45] Date of Patent: May 7, 1996

[54] SPATIAL DIVISION MULTIPLE ACCESS WIRELESS COMMUNICATION SYSTEMS

[75] Inventors: Richard H. Roy, III, Cupertino, Calif.; Bjorn Ottersten, Stockholm, Sweden

[73] Assignee: ArrayComm, Inc., Santa Clara, Calif.

[21] Appl. No.: 806,695

[22] Filed: Dec. 12, 1991

[51] Int. Cl.$^6$ .................................................. H04Q 7/00
[52] U.S. Cl. ..................... 370/95.1; 364/574; 370/119
[58] Field of Search ............................. 370/95.1, 95.3, 370/119; 342/386, 448, 442; 358/425, 133, 167; 455/60, 132, 137, 139, 272, 273, 33.2, 33.3; 359/183, 117, 154, 189; 375/295; 364/572, 574, 578, 581

[56] References Cited

U.S. PATENT DOCUMENTS

| | | | |
|---|---|---|---|
| 3,704,465 | 11/1972 | Masak et al. | 342/386 |
| 3,774,209 | 11/1973 | Fleming et al. | 342/386 |
| 3,798,645 | 3/1974 | Baurle et al. | 342/386 |
| 3,852,749 | 12/1974 | Kohler | 342/386 |
| 3,946,385 | 3/1976 | Ewen | 343/102 |
| 4,085,319 | 4/1978 | Deitz et al. | 359/183 |
| 4,128,740 | 12/1978 | Graziano | 179/2 |
| 4,434,505 | 2/1984 | Gutleber | 455/50 |
| 4,475,010 | 10/1984 | Huensch | 179/2 |
| 4,626,859 | 12/1986 | Stansfield | 342/442 |
| 4,639,914 | 1/1987 | Winters | 455/33 |
| 4,737,794 | 4/1988 | Jones | 342/386 |
| 4,742,356 | 5/1988 | Kuipers | 342/386 |
| 4,750,147 | 6/1988 | Roy | 364/807 |
| 4,796,291 | 1/1989 | Makino | 358/58 |
| 4,829,554 | 5/1989 | Barnes | 379/58 |
| 4,837,800 | 6/1989 | Freeburg | 379/59 |
| 4,910,794 | 3/1990 | Mahany | 455/47 |
| 4,947,452 | 8/1990 | Hattori | 455/33 |
| 4,955,082 | 9/1990 | Hattori | 455/33 |

(List continued on next page.)

FOREIGN PATENT DOCUMENTS 2237706  5/1991  United Kingdom.

OTHER PUBLICATIONS

Friedlander, "Direction Finding Using an Interpolated Array", 1990, pp. 2951–2954–IEEE Publication.
Friedlander, B. & Weiss, A., "Direction Finding for Wideband Signals Using an Interpolated Array", 1991–IEEE Publication–pp. 583–587.

Primary Examiner—Wellington Chin
Assistant Examiner—Chau T. Nguyen
Attorney, Agent, or Firm—Townsend and Townsend and Crew; Henry K. Woodward

[57] ABSTRACT

A method and apparatus for increasing the capacity and quality of wireless communication between a plurality of remote users and a base station is disclosed. Using measurements from an array of receiving antennas at the base station, parameters of multiple signals transmitted to the base station from a plurality of users in the same channel are calculated and used to obtain the positions and velocities of the users. The locations and other related signal parameters are used to calculate appropriate spatial demultiplexing strategies, reconstructing the individual transmitted signals from the receiver measurements and reducing interference to acceptable levels. This heretofore unavailable location information is used in solving the hand-off problem. This information is also used to calculate an appropriate spatial multiplexing strategy for simultaneous transmission of signals to users in the same channel. This can be the same as or distinct from the aforementioned receive channel. In combination, the transmit and receive systems establish multiple full-duplex links in the same channel by directively receiving and transmitting signals at the base stations only. This invention can also be implemented at the mobile sites to improve signal quality and to establish point-to-point communication links between multiple mobile users. Furthermore, implementation of both transmit and receive functions at the base station is not required. A receive-only system base station will still improve received signal quality and therefore capacity in addition to mitigating the hand-off problem.

11 Claims, 15 Drawing Sheets

U.S. PATENT DOCUMENTS

| | | | |
|---|---|---|---|
| 4,965,732 | 10/1990 | Roy, III et al. | 364/460 |
| 4,965,849 | 10/1990 | Kunihiro | 455/34 |
| 4,965,850 | 10/1990 | Schloemer | 455/33 |
| 4,972,151 | 11/1990 | Rosen | 342/354 |
| 4,989,204 | 1/1991 | Shimizu | 370/94.1 |
| 5,052,799 | 10/1991 | Sasser et al. | 342/386 |
| 5,159,593 | 10/1992 | D'Amico et al. | 370/95.3 |
| 5,260,968 | 11/1993 | Gardner et al. | 375/1 |

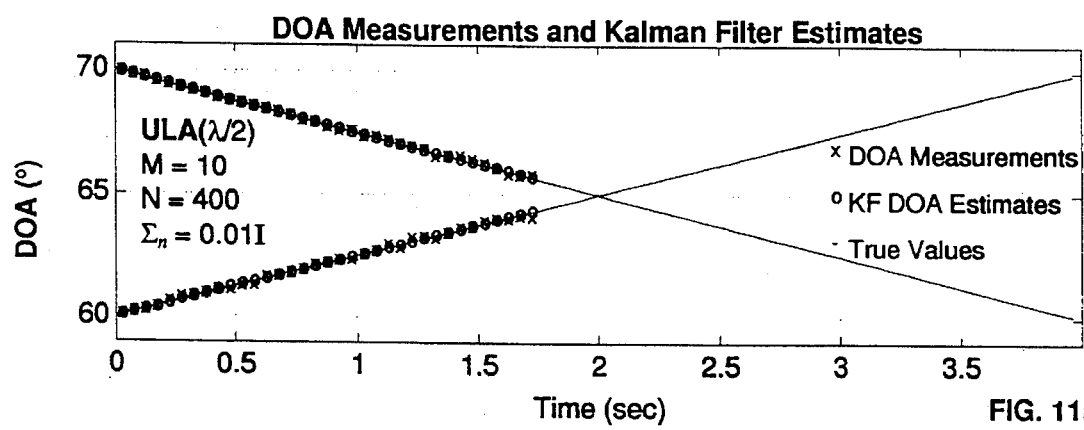
FIG. 11a
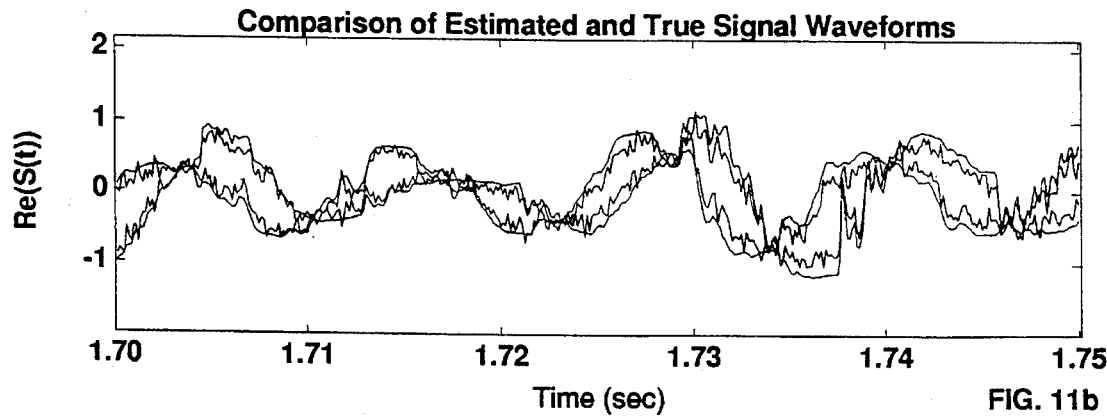
FIG. 11b
FIG. 11

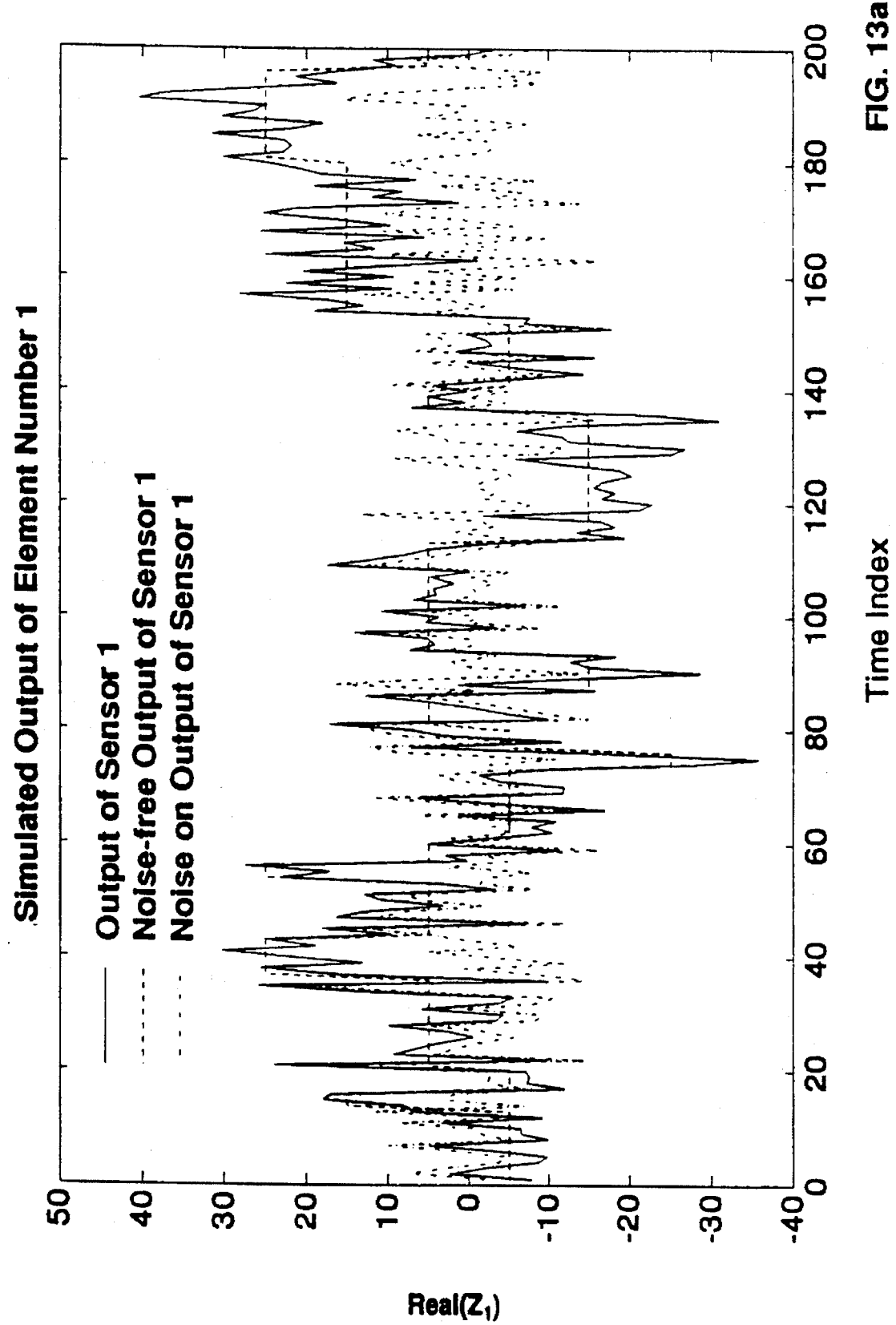

SPATIAL DIVISION MULTIPLE ACCESS WIRELESS COMMUNICATION SYSTEMS

FIELD OF THE INVENTION

The field of this invention relates to multiple access wireless information and communication networks and, in particular, to a method and apparatus for exploiting information collected by arrays of spatially distributed sensors to substantially increase the number and quality of communication channels in wireless networks by establishing spatially directive links capable of full-duplex operation in nonstationary environments without increasing the amount of allocated frequency spectrum.

BACKGROUND

Wireless communication systems are generally composed of one or more local central sites, herein termed base stations, through which wireless transmitter/receivers gain access to a larger information network. The base stations service a local area wherein a number of wireless users, fixed or mobile, are located. The function of the base station is to relay messages to and from users all over the network. In cellular mobile systems, for example, this task is performed by relaying messages to and receiving signals from a Mobile Telephone Switching Office (MTSO). A wireless user establishes a two-way (full-duplex) communication link with one or more other users also having some access to the network by first requesting access to the network through the local base station. This communication is accomplished in cellular mobile communications and wireless local area computer networks (LANs), for example, by suitably modulating electromagnetic waves.

Conventional wireless communication systems requires that users transmit signals in different frequency channels, use different coding schemes in the same frequency channels, or be transmitted in non-overlapping time intervals for the signals to be correctly received. One aspect of the present invention describes a method and apparatus for separating multiple messages in the same frequency, code, or time channel using the fact that they are in different spatial channels. Hereinafter, the term channel will be used to denote any of the conventional channels (frequency, time, code) or any combination thereof. The term spatial channel refers to the new concept unique to this the present invention.

Wireless communication is becoming increasingly common form of communication (D. Goodman, "Trends in Cellular and Cordless Communications," IEEE Communications Magazine, June 1991), and the demand for such service continues to grow. Examples include cellular mobile communication networks, wireless local area computer networks, wireless telephone networks, cordless telephones, satellite communication networks, wireless cable TV, multi-user paging systems, high-frequency (HF) modems, and more. Current implementations of these communication systems are all confined to limited frequency bands of operation either by practical considerations or, as is more often the case, by government regulation. As the capacity of these systems has been reached, demand for more service must to be met by allocating more frequency spectrum to the particular application along with attempts to utilize the allocated spectrum more efficiently. In light of the basic physical principle that transmission of information requires bandwidth, the fundamental limitations of a finite amount of practically usable spectrum present a substantial barrier to meeting an exponentially increasing demand for wireless information transmission. Since, as has been demonstrated over the last decade, the amount of practically usable frequency spectrum can not keep pace with the demand, there is a critical need for new technology for increasing the ability of such systems to transfer information (D. Goodman, op. cit., G. Calhoun, Digital Cellular Radio, Artech House 1988). This invention directly addresses this need and is compatible with current as well as future modulation schemes and standards (D. Goodman, "Second Generation Wireless Information Networks," IEEE Trans. on Veh. Tech., Vol. 40, No. 2, May 1991).

In conventional wireless communication systems, a base station serves many channels by means of different multiple access schemes, the most common being Frequency-Division Multiple Access (FDMA), Time-Division Multiple Access (TDMA), and more recently Code-Division Multiple Access (CDMA). All current systems employ FDMA wherein the available frequency bandwidth is sliced into multiple frequency channels and signals are transmitted simultaneously, with a maximum of one per channel at any given time. All wireless systems also currently employ TDMA, a technique wherein multiple users share a common frequency channel by doing so at different times, in that when a user no longer requires the channel assigned to it, the channel is reassigned to another user.

In conventional wireless communication systems, TDMA is also being exploited on a more detailed level. Analog data such as voice is digitized, compressed, then sent in bursts over an assigned frequency channel in assigned time slots. By interleaving multiple users in the available time slots, increases in the capacity (i.e., number of simultaneous users) of the system can be achieved. This requires substantial modifications to the base station receiver hardware as well as the mobile units themselves, however, since the current analog units are not capable of exploiting this technology. Consequently, a dual-mode standard, supporting both the new digital and the old analog transmission schemes, has had to be adopted.

CDMA allows multiple users to share a common frequency channel by using coded modulation schemes. The technology involves preprocessing the signal to be transmitted by digitizing it, modulating a wideband coded pulse train, and transmitting the modulated coded signal in the assigned channel. Multiple users are given distinct codes which decoders in the receivers are programmed to detect. If properly designed, the number of simultaneous users of such a system can be increased over the current state-of-the-art. While theoretically sound, however, the technology has yet to be proven. There are substantial practical problems with the scheme, the most important being a stringent requirement for accurate and rapid power control of the wireless transmitters. Such problems may vitiate the usefulness of CDMA in wireless communication networks. Should CDMA survive, however, the SDMA concept described herein can be applied directly to further increase capacity and system performance.

The aforementioned techniques represent various attempts to more efficiently pack an increasing number of signals into fixed-width frequency channels. These techniques do not exploit the spatial dimension when establishing channels. This invention describes how, in addition to traditional schemes, the spatial dimension can be exploited to significantly increase the quality of the communication links, reduce the required amount of transmitted power, and most importantly increase the number of channels that a base station can serve without allocation of more frequency channels. This technique is hereafter referred to as Spatial-Division Multiple Access (SDMA).

In conventional wireless communication systems, exploitation of the spatial dimension is limited to what is referred to as spatial diversity and sectorization. In spatial diversity, most commonly associated with mobile systems, two antennas are employed on reception only, and the one with the strongest signal in the bandwidth of interest is chosen for further processing, or some method for combining the two outputs is applied (P. Balaban and J. Salz, "Dual Diversity Combining and Equalization in Digital Cellular Mobile Radio", IEEE Trans. on Veh. Tech., Vo 40, No. 2, May 1991). Though this leads to a minor improvement in the quality of the received signal, there is no increase in system capacity.

To increase the capacity of cellular systems, service providers have been installing more cell sites, reducing the area covered by each site so that more users can access the system. The idea is that signals far enough away will not interfere with local sources since power dissipates quite rapidly in space the further from the transmitter the receiver is located. This straightforward approach to increasing capacity is, however, quite costly as the amount of cell site hardware required is proportional to the number of cell sites, which in turn is inversely proportional to the square of the factor by which the effective radius of each cell is decreased. In fact, the current economics of the situation dictate that service providers bid for precious frequency spectrum before even considering installation of new cell sites (G. Calhoun, Digital Cellular Radio, Artech House 1988). Furthermore, this strategy also greatly exacerbates the hand-off problem as discussed further on since users enter and leave cells more often when the cells are smaller.

Sectorization is similar in spirit and is another technique for increasing capacity by essentially making the local areas served by each cell smaller, thus adding more cells to the network. This is accomplished at a common location by employing directive antennas, i.e., receiving antennas at the cell site which receive mobile transmissions is a particular sector only. Patents related to this basic cellular concept have been issued to Motorola in 1977 (V. Graziano, "Antenna Array for a Cellular RF Communications System," U.S. Pat. No. 4,128,740, 13/1977, U.S. Cl. 179-2 EB), Harris Corporation in 1985 (M. Barnes, "Cellular Mobile Telephone System and Method," U.S. Pat. No. 4,829,554, 55/1985, U.S. Cl. 379-58), NEC Corporation in 1986 (M. Makino, "Mobile Radio Communications System," U.S. Pat. No. 4,575,582, C.I.P. 4,796,291, 3/1986, U.S. Cl. 358-58), and Sony Corporation (T. Kunihiro, "Cordless Telephone," U.S. Pat. No. 4,965,849, 9/1989, U.S. Cl. 455-34) to name just a few. With recent developments in digital technology making digital transmission and reception of information economically feasible, there have been a significant number of patents in this area as well including S. Hattori, et al., "Mobile Communication System," U.S. Pat. No. 4,947,452, 10/1989, U.S. Cl. 455-33; S. Hattori, et al., "Mobile Communication System," U.S. Pat. No. 4,955,082, 1/1989, U.S. Cl. 455-33; T. Shimizu, et al., "High Throughput Communication Method and System for a Digital Mobile Station When Crossing a Zone Boundary During a Session," U.S. Pat. No. 4,989,204, 12/1989, U.S. Cl. 370-94.1; Freeburg, et al., "Cellular Data Telephone System and Cellular Data Telephone Therefor," U.S. Pat. No. 4,837,800, 13/1988, U.S. Cl. 379-59; and R. Mahany, "Mobile Radio Data Communication System and Method," U.S. Pat. No. 4,910,794, 6/1988, U.S. Cl. 455-67. Though sectorization increases capacity, it has limited potential for meeting future demand and is fundamentally limited by the basic physical principles that do not permit the design of exceedingly small sectors without exceedingly large antennas. Furthermore, since sectorization is simply another method for increasing the number of cells, the hand-off problem which is discussed in detail further on, is exacerbated.

In the aforementioned conventional systems, it is assumed that there is only one mobile unit at a time transmitting in a given cell on a given frequency. Other transmitters actively transmitting in the same frequency channel at the same time are considered to be cochannel interference, a situation which current systems attempt to prevent since it leads to significant performance degradation. Cochannel interference, in fact, is a major factor in determining how often (spatially) frequency channels can be reused, i.e., assigned to different cells (W. Lee, Mobile Cellular Telecommunication Systems, McGraw-Hill, 1989). The cochannel interference problem pervades all wireless communication systems, not just cellular mobile communications, and attempts to solve it in current systems have all been formulated on the premise that the cochannel signals represent disturbances to be eliminated an that only one antenna/receiver output is available for the task.

Conventional systems in which interference suppression is performed using adaptive filters in the time-domain and the output of a single antenna includes F. Gutleber, "Interference Cancelling System for a Mobile Subscriber Access Communications System," U.S. Pat. No. 4,434,505, 14/1982, U.S. Cl. 455-50; and Y. Shimura, "Base Station Capable of Monitoring Occurrence of Interference on Every Transmission," U.S. Pat. No. 4,837,801, 8/1987, U.S. Cl. 379-61. These techniques are based on an assumption of statistical stationarity, i.e., that the channel characteristics do not change very fast. In the mobile communications environment where deep Rayleigh fading (40 dB) at rates up to 200 Hz is a dominant factor, the stationarity assumption is known to be invalid, and the performance of these conventional techniques is known to be quite susceptible to errors in the assumptions made. In particular, in the presence of multiple delayed copies of the same signal (i.e., specular multipath), these adaptive filters can null the desired signal.

Time-domain adaptive filter techniques have also been developed to improve channel quality for digital transmission in the presence of the aforementioned Rayleigh fading which causes intersymbol interference at the receiver. Examples of conventional techniques for addressing this type of interference include J. Proakis, "Adaptive Equalization for TDMA Digital Mobile Radio", IEEE Trans. on Veh. Tech., Vo. 40, No. 2, May 1991, and numerous other technical references in the open literature. Similar equalization techniques have been adopted in the current digital GSM system. The foregoing systems are completely compatible with this invention and can be incorporated in the demodulation step as is currently done in practice.

More recently, investigations have been undertaken into the possibility of combining the outputs of more than one antenna to improve signal quality by eliminating cochannel interference. In the context of wireless LANs and PBXs, a multi-channel adaptive equalization scheme has been described by J. Winter, "Wireless PBX/LAN System with Optimum Combining," U.S. Pat. No. 4,639,914, 9/1984, U.S. C. 370-110.1. This method relies on code assignment (CDMA) to a known number of transmitters and tight power control circuitry. It also requires time-division duplexing, i.e., transmission and reception at the base station and the wireless terminals must occur at different times on the same frequency. This requirement results from the fact that the information in the spatial dimension is not being fully exploited; source locations are not calculated. The aforementioned stationarity assumption is also critical to the technique and it is therefore not applicable to the mobile environment. Furthermore, it is modulation dependent and is designed solely for interoffice wireless LANs using digital transmission technology.

In the context of simply combating the cellular mobile problem of Rayleigh fading at the mobile receiver, a method of incorporating plural antennas is also described by P. Balaban and J. Salz, op. cit. Herein as in similar well-known techniques various assumptions concerning the temporal characteristics of the signal of interest and its relationship to the cochannel interfering signals are made and on the basis thereof, a time-varying filter is constructed with best possible reconstruction of the signal of interest as its sole purpose. The performance of this technique is also known to be quite susceptible to errors in the assumptions made, specifically the stationary channel assumption. In fact, mobile unit implementation of this invention mitigates the Rayleigh fading problem to a large extent.

The undesirable characteristics of the aforementioned adaptive techniques are a consequence of the fact that only assumed time-domain properties of the received signals are being exploited, and that one of the signals present in the data is treated differently from the remaining signals, i.e., the cochannel interferers. It has been found that cochannel interferers simply represent a plurality of users attempting to access the system simultaneously on the same channel. Accordingly, one aspect of the present invention enables this situation to be managed regardless of the modulation type (analog or digital) and in the presence of multiple arrivals of the same signal (i.e., specular multipath) is a significant advantage over the above described conventional techniques.

Efficient exploitation of the spatial dimension to increase capacity requires the ability to separate a number of users simultaneously communicating on the same channel at the same time in the same local area (cell). As will be explained, one aspect of the present invention performs this separation by distinguishing the signals on the basis of their angle-of-arrival, information which is used to ascertain the location of the transmitters. The process of localization of the transmitter according to this aspect of the invention provides heretofore unexpected advantages over conventional techniques.

Localization of signals in space using data collected by an array of sensors has been accomplished in fields other than wireless communications. Such is the case, for example, in tracking of aircraft and other aerospace objects using phased-array radars. Examples of arrays with such structure include R. Roy, et al., "Methods for Estimating Signal Source Locations and Signal Parameters Using an Array of Signal Sensor Pairs," U.S. Pat. No. 4,750,147, 3/1985, U.S. Cl. 364-800, and R. Roy, et al., "Methods and Arrangements for Signal Reception and Parameter Estimation," U.S. Pat. No. 4,965,732, 7/1987, U.S. Cl. 364-460. The arrays used therein, however, are required to possess a special structure, i.e., sensors occur in pairs of identical elements. The present invention is not limited to the use of such specialized array structure.

SUMMARY OF THE INVENTION

The present invention is directed to a method and apparatus for increasing capacity and improving quality of wireless communication networks. By appropriately collecting and subsequently processing spatially distributed sensor measurements, the spatial locations of multiple sources simultaneously transmitting information in a common channel can be estimated and the individual signal waveforms reconstructed. Using location information and an appropriately designed transmitter array, information is simultaneously transmitted to the sources on a common channel without creating cochannel interference which would otherwise compromise two-way (full-duplex) communication links. Unique to this invention is the estimation of source locations and spatial demultiplexing of multiple signals in the same channel, and a method for establishing communication between multiple transmitters and receivers on the same channel.

With regard to the cellular mobile communications marketplace in particular, it is generally agreed that there are four areas of major concern that do not seem to be addressable by conventional techniques (G. Calhoun, op. cit.):

1. flaws in the coverage of the area served by the base station network,
2. flaws in the processing of the calls by the base stations and the MTSO,
3. lack of communications privacy and security, and
4. the problem of digital data transmission.

The consensus among those skilled in the art of communication systems design is that a technological breakthrough is required to solve these critical problems. Interestingly the capacity problem is not mentioned in this particular list, though it is the major theme of the entire monograph (G. Calhoun, op. cit.). This invention is a technological breakthrough that directly addresses the first three issues, is compatible with any of the potential solutions to the fourth, and directly addresses the major concern, that of increasing capacity of current wireless communication networks without increasing allocated bandwidth.

Flaws in the area coverage are simply due to the fact that cellular systems are currently constructed on the basis of a simple geometric model of coverage area, e.g., the area covered by a particular base station is a symmetric geometrical object collections of which are capable of tiling a large geographic area with a minimum of overlap. The hexagon is the primary example. Unfortunately, this is a deficient design strategy which takes into account neither the topology of the urban area (configuration of skyscrapers, hills areas of dense foliage, etc.) nor the nonuniform distribution of potential users of the system, e.g., freeways which become parking lots at rush hour, delaying people's schedules and creating a demand for mobile communication services highly concentrated in one particular area or hot spot. These issues are now known to be exceedingly important in the proper design of cell site networks, but conventional techniques do not indicate a good solution. Cells do not have well-defined boundaries and the real-world irregularities can seriously reduce the efficiency of the cellular system. An AT&T study (J. Whitehead, "Cellular System Design: An Emerging Engineering Discipline," *IEEE Communications Magazine*, Vol. 24, No. 2, February 1986, p. 10) concluded that "irregular traffic, terrain, and growth situations limit the spectrum efficiency of orthodox [cellular designs] to about half the ideal".

One aspect of this invention overcomes the problem of area coverage. By appropriately processing the outputs of multiple antennas at the base stations, an increase in effective receiver gain is achieved and signals of significantly lower power than those receivable in the conventional devices are detected and capable of being processed. This directly mitigates the problem of signal drop-out to a large extent. Furthermore, with cooperating base stations, several base stations can service the same geographic area during periods of peak usage by dynamic allocation of channels among base stations, thereby eliminating hot spots when and where they occur.

Flaws in the processing of calls are a major concern to the cellular industry. The basic problem arises due to the fact that calls must be transferred in a process termed hand-off from one base station to another as the mobile unit moves from one cell to an adjacent cell. The problem with current cellular systems is that the location of the mobile unit is unknown and clearly therefore neither is its direction of motion (or for that matter even whether it is moving or stationary). Without this information, the cellular system has no idea to which cell the hand-off should be performed. Current systems rely solely on the received power levels to ascertain whether to attempt a hand-off, and to which cell the call or link should be assigned (G. Huensch, et al., "High Density Cellular Mobile Radio Communications," U.S. Pat. No. 4,475,010, 27/1983, U.S. Cl. 179-2 EB). Due to the aforementioned irregularities in area coverage, there is a significant probability that the call will be handed to an inappropriate cell, one sufficiently far away that once the mobile unit changes location by a small amount, the assignment error becomes obvious.

According to some cellular operators, this is a substantial problem. The cellular system in Los Angeles has experienced "considerable problems with crosstalk. You get to a high elevation, your own signal weakens and you start hearing another conversation. Right after that, you lose the call." (S. Titch, "For PacTel Mobile, Bigger is not Better", *Communications Week*, Jan. 27, 1986, p. 54). The former director of cellular development for Motorola has stated that "anywhere from 10% to 25% of the time the system made decision errors when a subscriber moved from one cell to another. When the switch made an error it assigned the subscriber's call to a distant cell site rather than the closest one. The system would then start serving a different subscriber on the same frequency in the same cell as the first subscriber. The result was cellular disaster. When this situation occurs, subscribers hear other subscribers conversations on their channels. They get cutoff or, if they are lucky, [?], the channel gets noisy. This problem happens often enough to be infuriating." (M. Cooper, "Cellular Does Work—If the System is Designed Correctly," *Personal Communications*, June 1985, p. 41) In addition to the crosstalk problem, mounting evidence indicates local variations in signal strength cause significantly higher handoff rates than predicted based on hard-cell boundaries, and this increased load on the central switch is cause for concern that the cellular system capacity may be reduced.

One aspect of this invention overcomes the problem of flaws in call processing. By providing estimates of the locations and velocities of the mobile units heretofore not available, intelligent hand-off strategies can be instituted. This directly meets fills the need of the cellular operators to know the location and velocity of the mobile unit. Coupled with the increased capability to process lower power signals, the foregoing aspects of the present invention achieve a significant improvement in the performance of cellular communication systems.

Privacy is another issue of great concern to the cellular industry. The insecure nature of the current systems (anyone can legally listen to all mobile channels) is a critical factor impacting sales of the system to customers involved in sensitive business transactions as well as many government users. Cellular operators are realizing that some positive solution must be found (G. Calhoun, op. cit.). The root of the problem is that in current systems, the signals are transmitted by non-directional antennas as uniformly as is possible over the region or sector they serve, and can be intercepted by receivers located practically anywhere nearby. One solution to this problem is encryption. However, this requires either analog-to-digital(de-)encryption-to-analog hardware at both cell site and the mobile unit, or conversion to a new digital standard, both of which are rather costly solutions.

Another aspect of this invention provides a significant improvement in maintaining privacy. Utilizing knowledge of the location of the intended receiver, the base station transmitter is designed so as to transmit the intended signal essentially in that direction only. By transmitting the signal in only one direction, eavesdropping is mitigated to a large extent. To intercept the signal, the eavesdropper must be in the same geographical region, a condition which will occur rarely in practice. The extent to which the transmitted signal from the base station to the mobile unit can be localized in space is a direct function of the number of transmitting antennas available. As is well-known, in conventional devices such as phased-array antennas, so-called beamwidths of transmitted energy depend directly on the antenna aperture and the number and location of the transmitting antennas. Thus, system security from the base station to the mobile unit can be easily increased at the cost of increasing the transmitter hardware at the base stations. Although not required in this invention, the same system can be employed at the mobile unit employing multiple receive and transmit antennas to locate the (electrically) closest base station and transmit selectively in that direction. The drawback is the significant increase in mobile unit complexity.

The lack of compatibility of current analog cellular systems with digital data transmission is not an issue of major concern presently. Most users are concerned with voice transmission and the currently allocated bandwidths (30 KHz per channel) are sufficient for that purpose. They do, however, fundamentally limit the amount of data which can be successfully transmitted to about 10 kb/s theoretically, and to about 1200 b/s practically due to the poor quality of the channel. As users' demands increase, so will the need for high-speed data transmission over the cellular network and the current system will have to be revised.

In this regard, another aspect of this invention is independence of the signal modulation scheme. It works equally well with digital or analog modulation of the source signals. In fact, one of the major concerns in applying digital spread-spectrum techniques in the cellular mobile industry is that of intersymbol interference from multipath reflections. This problem is mitigated by the present invention since by employing multiple antennas, the different directions-of-arrival associated with different paths from the same source can be detected, and spatial isolation of the multiple arrivals therefrom performed. A second concern with digital modulation is the need to maintain as large a signal-to-noise ratio as is possible to keep bit error rates as low as possible. By employing this invention, the strength of received signals at the base station can be significantly improved over existing systems for the same amount of transmitted power thus providing a significant improvement in system performance.

Since in conventional systems the locations of the wireless units are not known, uniform, non-directional (in azimuth) transmission from the cell sites to the wireless units is the only reasonable strategy. Unique to this invention, however, is the ability to estimate the location of multiple transmitters in the same channel. This information, heretofore unexploitable, is used in the present invention for designing efficient strategies for multiple signal cochannel transmission from the cell site to the wireless unit. Well-known in conventional systems is the design of antenna arrays to selectively transmit energy in prescribed directions as a function of frequency (H. Rosen, "Steered-Beam Satellite Communication System," U.S. Pat. No. 4,972,151, 9/1985, U.S. Cl. 342-354). As an unexpected result of this invention, spatially selective transmission of multiple cochannel signals from cell site to wireless units is made possible. In addition, the amount of power transmitted in directions other than that of the intended receiver is minimized, further mitigating the problem of cochannel interference. Another unique aspect of the present invention is the design of robust techniques for performing this task.

In summary, this invention addresses key issues and problems facing the cellular mobile communications industry as well as other wireless communication networks by essentially restoring the property of wireline service, that of point-to-point communication, lost when wires are eliminated in favor of wide-area (omni-directional) transmission and reception of (electromagnetic) radiation. No attempt is made in conventional techniques to:

1. exploit information collected by an array of sensors for the purpose of detecting and estimating the location of multiple signals on the same (frequency) channel at the same time,
2. simultaneously estimate all transmitted signals, or
3. use spatial information to simultaneously selectively transmit different signals to one or more users on the same (frequency) channel.

The foregoing processes are unique to this invention and yield useful new and unexpected results in wireless communication networks. Although the improvements achieved by the invention may increase hardware complexity, such costs are easily offset by the attendant improvement in performance and capacity. Furthermore, since this invention need not be employed at the mobile units, the cost of increasing the quality and capacity of current wireless networks can be kept to a minimum, though further improvement in system performance can also be realized by mobile unit implementation of the invention.

Accordingly, this method and apparatus has the following advantages over current technology:

1. the invention will allow simultaneous use of any conventional (frequency, time or code) channel by multiple users, none of which occupy the same location in space, thereby increasing the capacity of current wireless information networks,
2. the invention provides for tracking of mobile sources, mitigating the hand-off and signal management problems present in conventional mobile cellular communication systems,
3. the invention is independent of the particular signal modulation type and therefore compatible with current and expected future modulation schemes in wireless communication systems,
4. the invention provides improved signal quality at both transmitters and receivers,
5. the invention provides for improved communication security by transmitting signals only in preferred directions thereby limiting the amount of unintentional radiation,
6. the invention allows a decrease in transmitter power to be effected at the cell site by directive transmission while still improving signal quality,
7. the invention significantly decreases signal degradation due to cochannel interference thereby allowing frequencies in adjacent cells to be re-used more frequently, further increasing system capacity,
8. mobile unit implementation of the invention can be effected with many of the aforementioned advantages applying to the mobile unit as well.

Though the advantages above have been described in the context of wireless communications, there are a number of applications in other areas. This invention, for example, can be used as a diagnostic measurement device for ascertaining the quality of cell site coverage. Herein, selective transmission is not required; the receive system is transported through the coverage area and the strengths and directions-of-arrival of signals transmitted from the base station are monitored. There are no known systems currently available for performing this function. The information thus obtained is important in assessing the quality of service from proposed cell site locations as well. Further objects and advantages will become apparent from a consideration of the drawings and ensuing detailed description.

BRIEF DESCRIPTION OF THE DRAWINGS

FIG. 11 contains DOA tracking and signal copy results for two nearly coincident moving FM transmitters in a severe Rayleigh fading environment.

Figure 1:
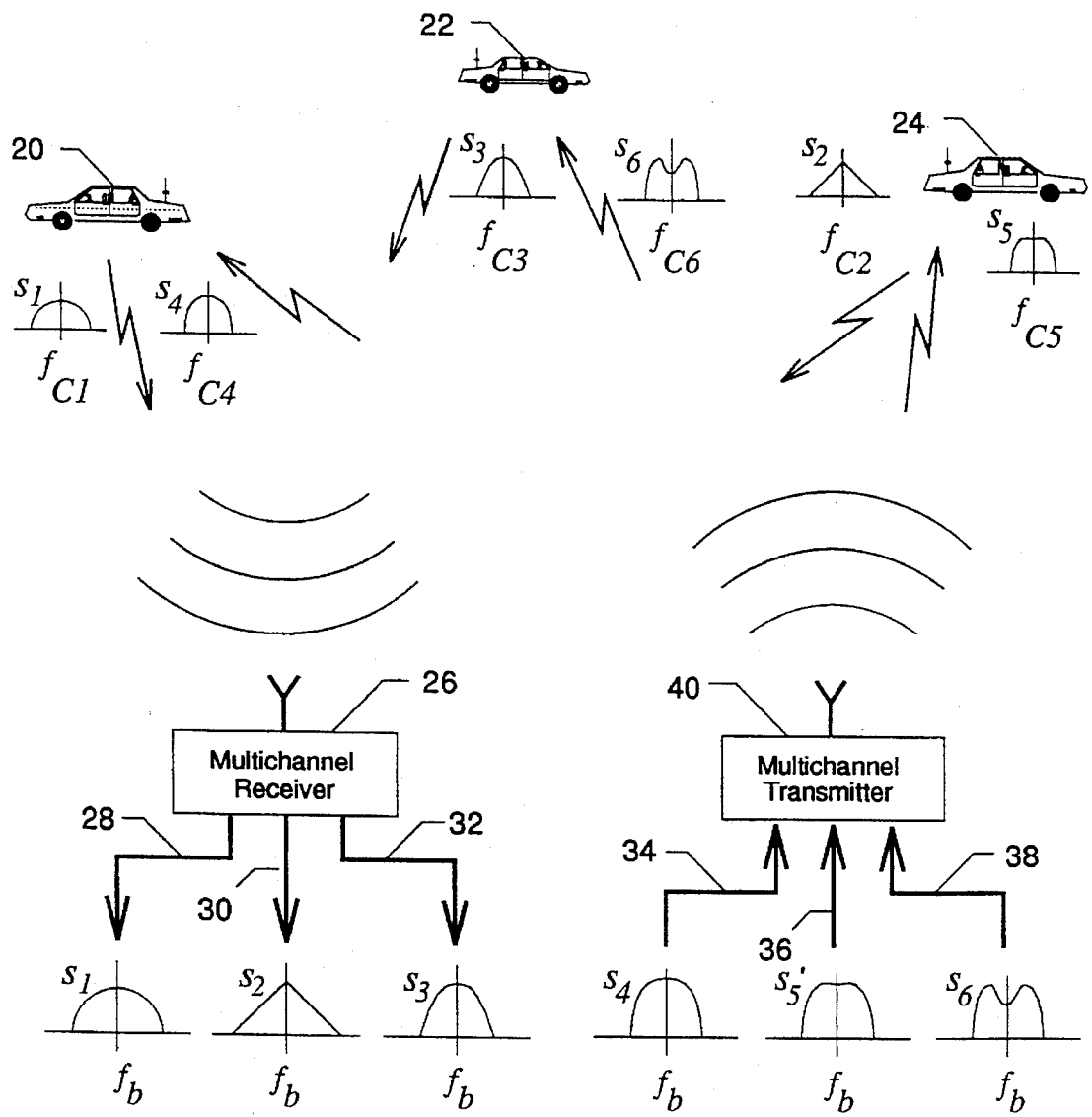
FIG. 1 is a diagram of conventional multiple wireless units successfully transmitting and receiving on different channels.

REFERENCE NUMERALS IN DRAWINGS 20. mobile unit 1 transmitter and receiver
22. mobile unit 2 transmitter and receiver
24. mobile unit d transmitter and receiver
26. conventional multi-channel receiver
28. channel 1 output of the conventional multi-channel receiver
30. channel 2 output of the conventional multi-channel receiver
32. channel d output of the conventional multi-channel receiver
34. channel 1 input to the conventional multi-channel transmitter
36. channel 2 input to the conventional multi-channel transmitter
38. channel d input to the conventional multi-channel transmitter
40. conventional multi-channel transmitter
42. conventional multi-channel receivers
44. conventional multi-channel receiver outputs
46. spatial demultiplexers
48. Spatial Division Multiple Access signal Processor (SDMAP)
50. spatially demultiplexed signals
52. signal demodulators
54. demodulated signals to switching network
56. wide area network
58. switching network
60. signals from switching network
62. signal modulators
64. modulated signals to be transmitted
66. spatial multiplexers
68. spatially multiplexed signals to transmitters
68. spatially multiplexed signals to transmitters
70. conventional multichannel transmitters
72. central controller
74. spatial multiplexer control signals
76. spatial demultiplexer control signals
78. central controller/SDMAP communication link
100. spatially combined signals received at base station
102. multi-channel receiver for antenna 1
104. multi-channel receiver for antenna 2
106. multi-channel receiver for antenna $m_r$
112. channel 1 output from receiver 1
114. channel 1 output from receiver 2
116. channel 1 output from receiver $m_r$
120. SDMAP and spatial demultiplexer
122. spatial demultiplexer output 1
124. spatial demultiplexer output 2
126. spatial demultiplexer output d
132. signal 1 input to channel 1 spatial multiplexer
134. signal 2 input to channel 1 spatial multiplexer
136. signal d input to channel 1 spatial multiplexer
138. SDMAP and spatial multiplexer
142. signal input to transmitter 1 channel 1
144. signal input to transmitter 2 channel 1
146. signal input to transmitter $m_{t_x}$
160. data compressor
162. signals to signal detector from data compressor
164. signal detector
166. signals to source tracker from data compressor
168. signals to parameter estimator from signal detector
170. parameter estimator
172. signal to source tracker from parameter estimator
174. source tracker
176. source tracker outputs
178. spatial demultiplexer controller
180. spatial multiplexer controller
182. tracker outputs to central controller
184. central controller signals to SDMAP
190. base station 1
192. base station 1 link to base station supervisor
194. base station 2
196. base station 2 link to base station supervisor
198. base station $n_b$ link to base station supervisor
200. base station $n_b$
202. SDMA processor for channel 1
204. SDMA processor for channel 2
206. SDMA processor for channel n
220. base station supervisor

DETAILED DESCRIPTION

FIG. 1 shows an example of current in wireless communication networks. Wireless transmitter/receiver units (20, 22, 24), for the purpose of illustration shown as vehicular mobile units, are assigned to distinct (frequency) channels and thereby allowed to communicate simultaneously. A multi-channel receiver (26) exploits the fact that they are on different frequency channels to correctly separate the signals (28, 30, 32) which are then subsequently demodulated and passed along to the rest of the network. A multi-channel transmitter (40) transmits signals (34, 36, 38) to the wireless units (20, 22, 24) in another set of distinct frequencies. For example, in current cellular mobile communication systems, mobile units receive transmissions from base stations in channels 45 MHz above those frequency channels they transmit information to the base stations. This allows for simultaneous transmission and reception of information at both the base station and mobile units.

Figure 2:
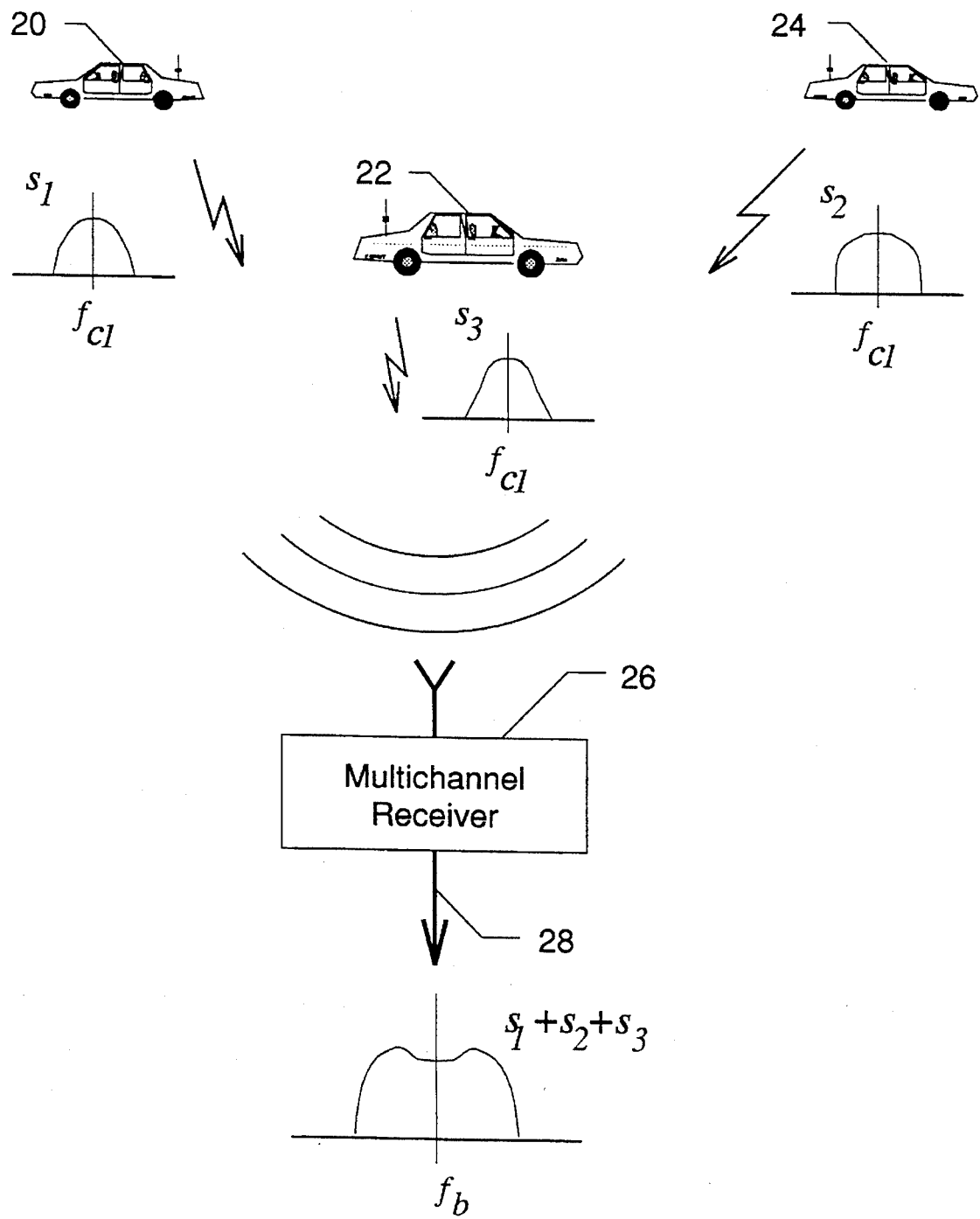
FIG. 2 is a graphic illustration of cochannel interference resulting from multiple wireless units transmitting on the same channel, a critical factor in limiting the capacity of current wireless communication systems.

FIG. 2 shows a disadvantage of current wireless communication systems. Wireless units (20, 22, 24) transmitting on the same conventional channel (the same carrier frequency $f_{c1}$ in this diagram) can not be resolved at the receiver (26) due to the fact that there is no way in current systems to distinguish one signal from the other when they share the same channel. The receiver output (28) is a combination of all signals present in the channel even after down-conversion to baseband frequency $f_b$.

Figure 3:
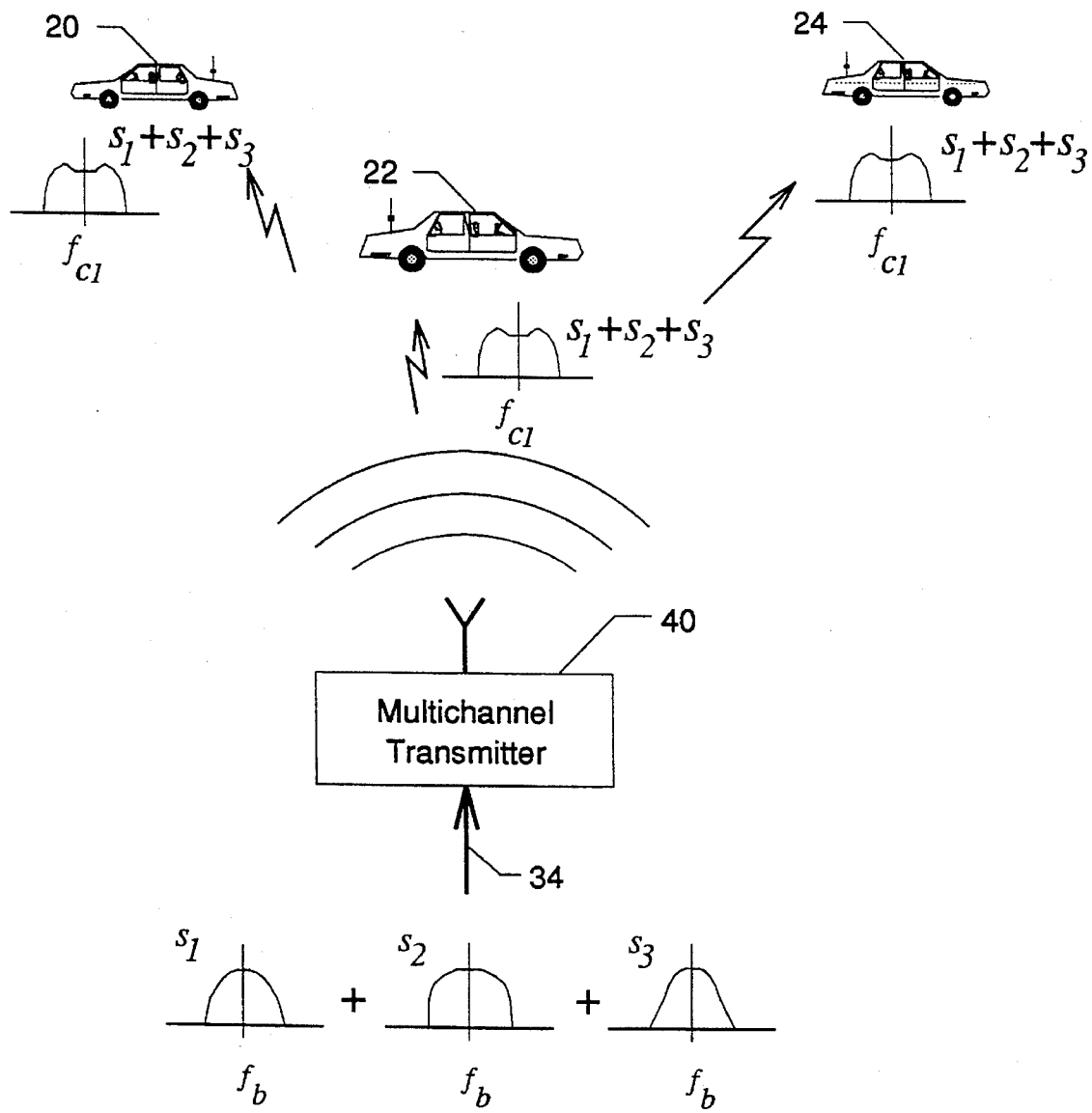
FIG. 3 is a graphic illustration of cochannel interference resulting from broadcast transmission of multiple signals on the same channel to multiple wireless units, a critical factor in limiting the capacity of current wireless communication systems.

FIG. 3 shows a similar current systems in wireless communication systems with respect to communication from the base station transmitter (40) to the remote receivers. The function of the multi-channel transmitter is to up-convert signals from baseband frequency $f_b$ to one of the multi-channel carrier frequencies for transmission to the mobile unit. Wireless units (20, 22, 24) on a particular channel (the same carrier frequency $f_{c1}$ in this diagram) receive a combination of multiple signals transmitted from the base station transmitter (40) in that frequency channel (34). This is due to the fact that there is no method in the current state-of-the-art for preventing all signals transmitted in the same frequency channel from reaching all receivers in a given cell or sector thereof set to receive signals in that particular channel. Signals received at the wireless units are combinations of all signals transmitted in that channel.

Figure 6:
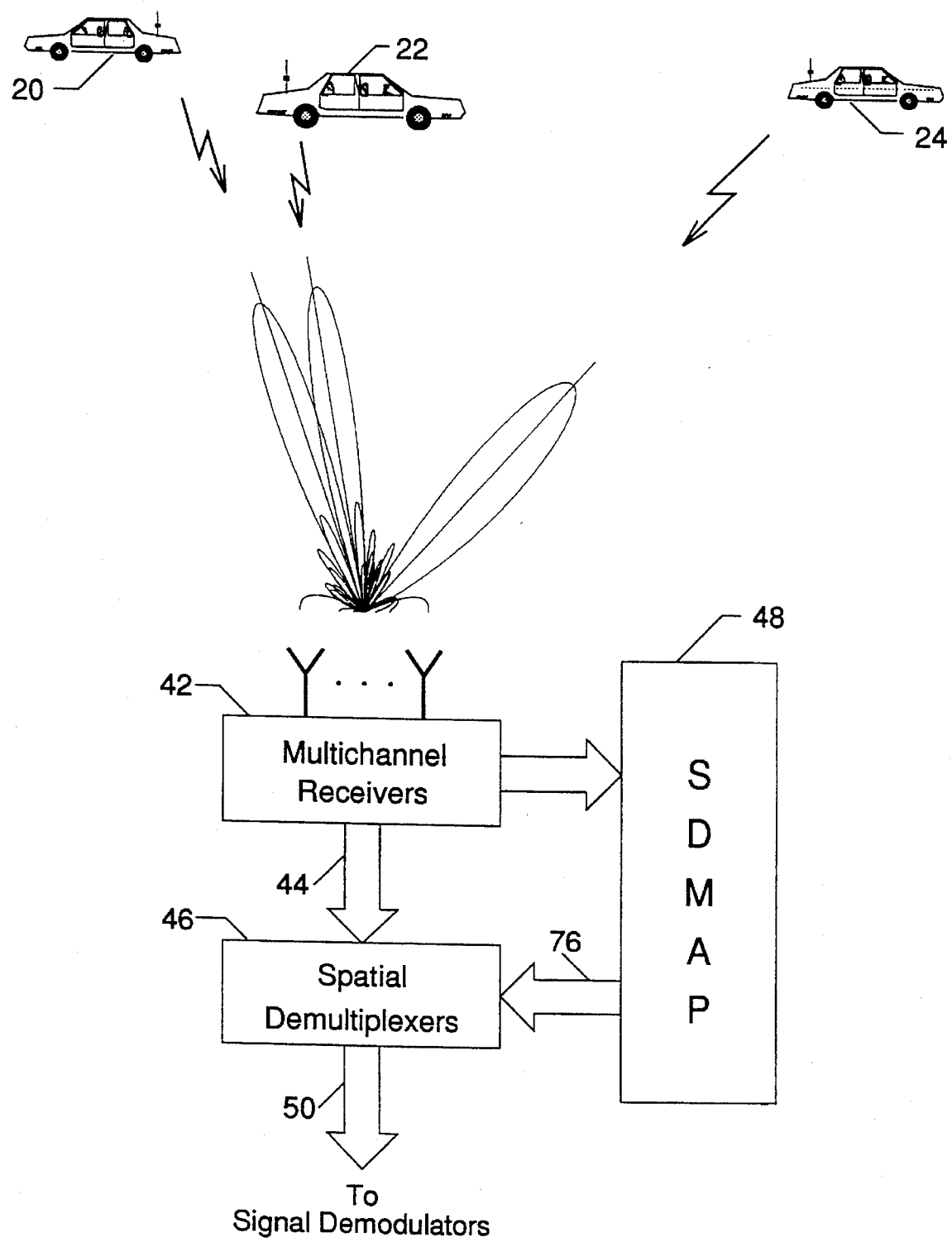
FIG. 6 is a graphic illustration of multiple cochannel signal reception at the central site in accordance with the invention.

FIG. 6 is an illustration of the method used by this invention to overcome the aforementioned multiple signal reception problem at one or more base stations. Multiple signals from wireless units (20,22,24) transmitting in the same channel are received by an array of sensors and receivers (42). These cochannel signals are spatially demultiplexed by a spatial demultiplexer (46) which is controlled by a Spatial Division Multiple Access signal Processor (SDMAP) (48). The demultiplexed signals (50) are then sent to signal demodulators (52) as is well-known in prior art.

Figure 8:
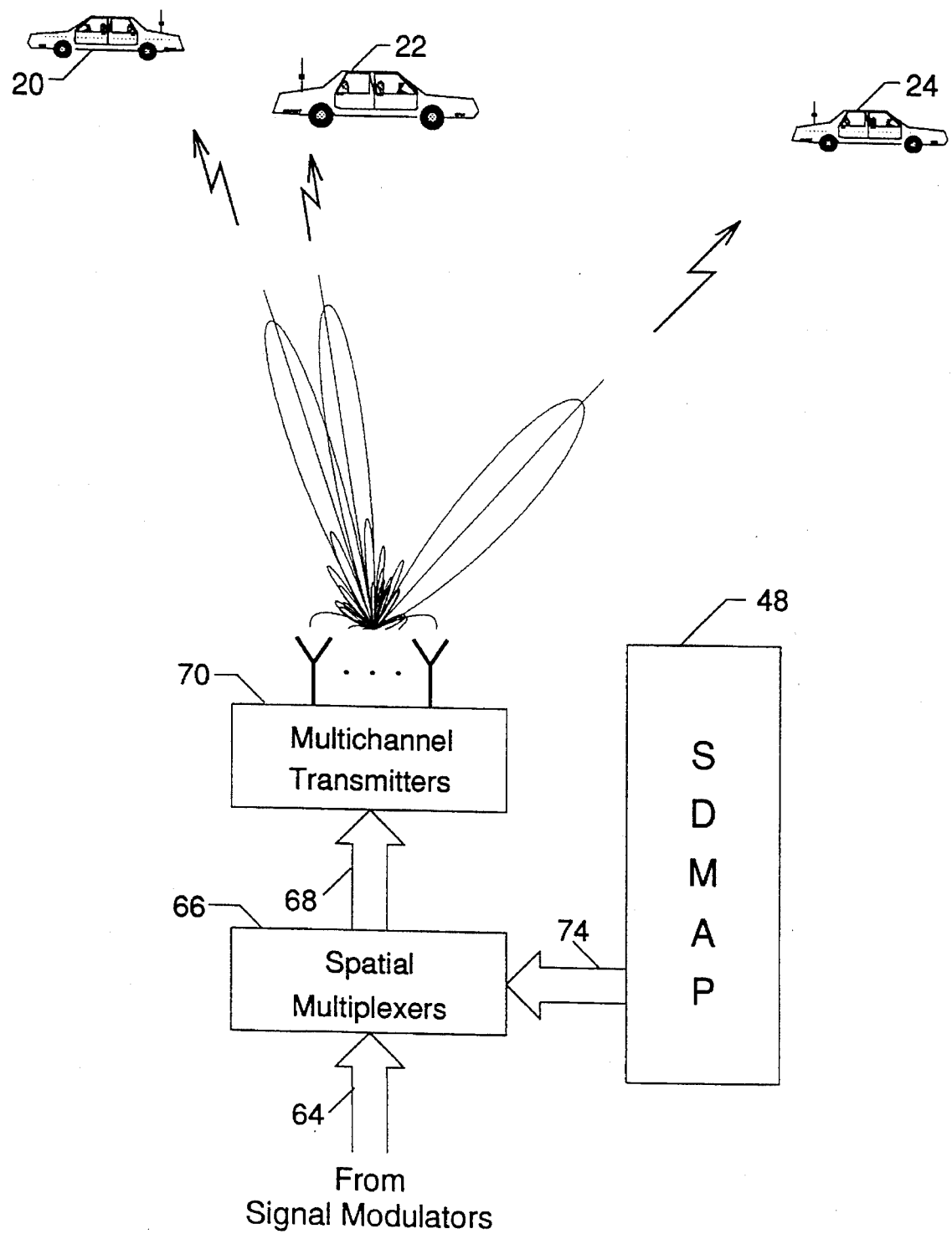
FIG. 8 is a graphic illustration of multiple cochannel signal transmission from the central site in accordance with the invention.

FIG. 8 is an illustration of the method used by this invention to overcome the aforementioned multiple signal reception problem at the mobile wireless unit. Multiple signals (64) from signal modulators, assumed therein as all being in the same frequency channel for illustrative purposes, are appropriately combined by a spatial multiplexer (66) under control of the SDMAP (48) so as to eliminate all cochannel interference at the wireless units (20,22,24). These signals (68) are sent to multichannel transmitters (70) and subsequently transmitted by an array of antennas to wireless units (20,22,24). As indicated in the illustration, by appropriate design of the spatial multiplexer, wireless unit (20) receives none of the signal being transmitted to units (22) or (24), and similarly for the other two units. In conjunction with FIG. 6, a plurality of full-duplex links are hereby established. The capability to establish more than one full-duplex link simultaneously in the same (frequency) channel is unique to the SDMA invention.

Figure 4:
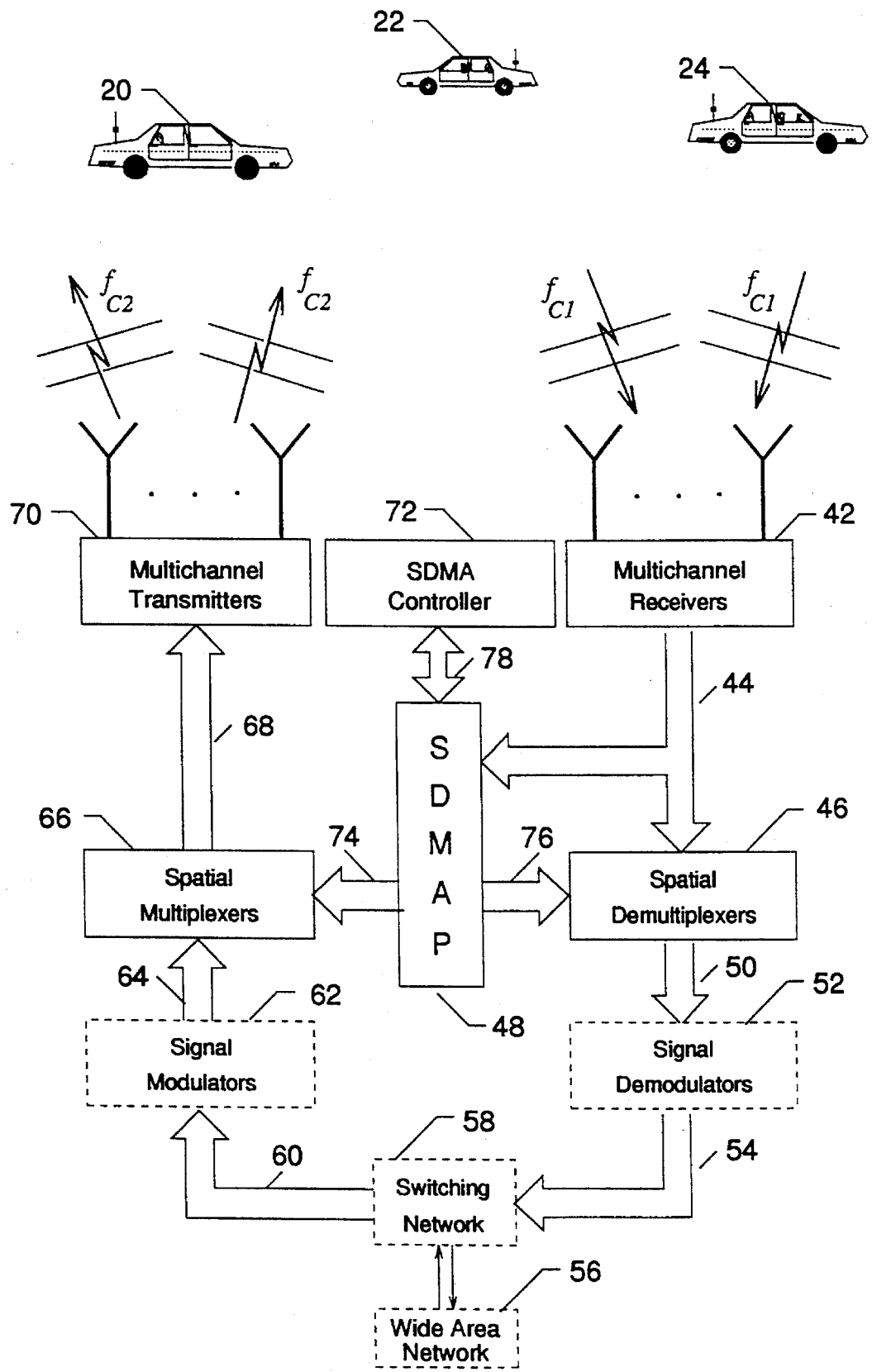
FIG. 4 is a block diagram of the SDMA system successfully receiving and transmitting multiple signals in one channel in accordance with the invention, thus achieving an increase in capacity by allowing multiple users to access one channel simultaneously.

FIG. 4 shows a block diagram of one embodiment of an SDMA system successfully receiving multiple signals in one channel and transmitting multiple signals in another channel by using different spatial channels. The intent of the figure is to indicate that these messages are broadcast on the same (frequency) channels, from the wireless units to the base-station at $f_{c1}$ and from the base station to the wireless units at $f_{c2}$, at the same time. This is a situation heretofore not allowed since the messages interfere with each other in current systems as indicated in FIG. 2 and FIG. 3. Signals transmitted in the same channel by wireless units (20,22,24) are received at the base station by multiple antennas. The output of each of $m_r$ antennas is sent to a multichannel receiver as is the practice in current systems for a single antenna. The $m_r$ antennas can be individual antennas or a multiple-feed single-dish antenna as is well-known. Herein each feed of a multiple-feed single-dish antenna is referred to as an antenna.

Figure 7:
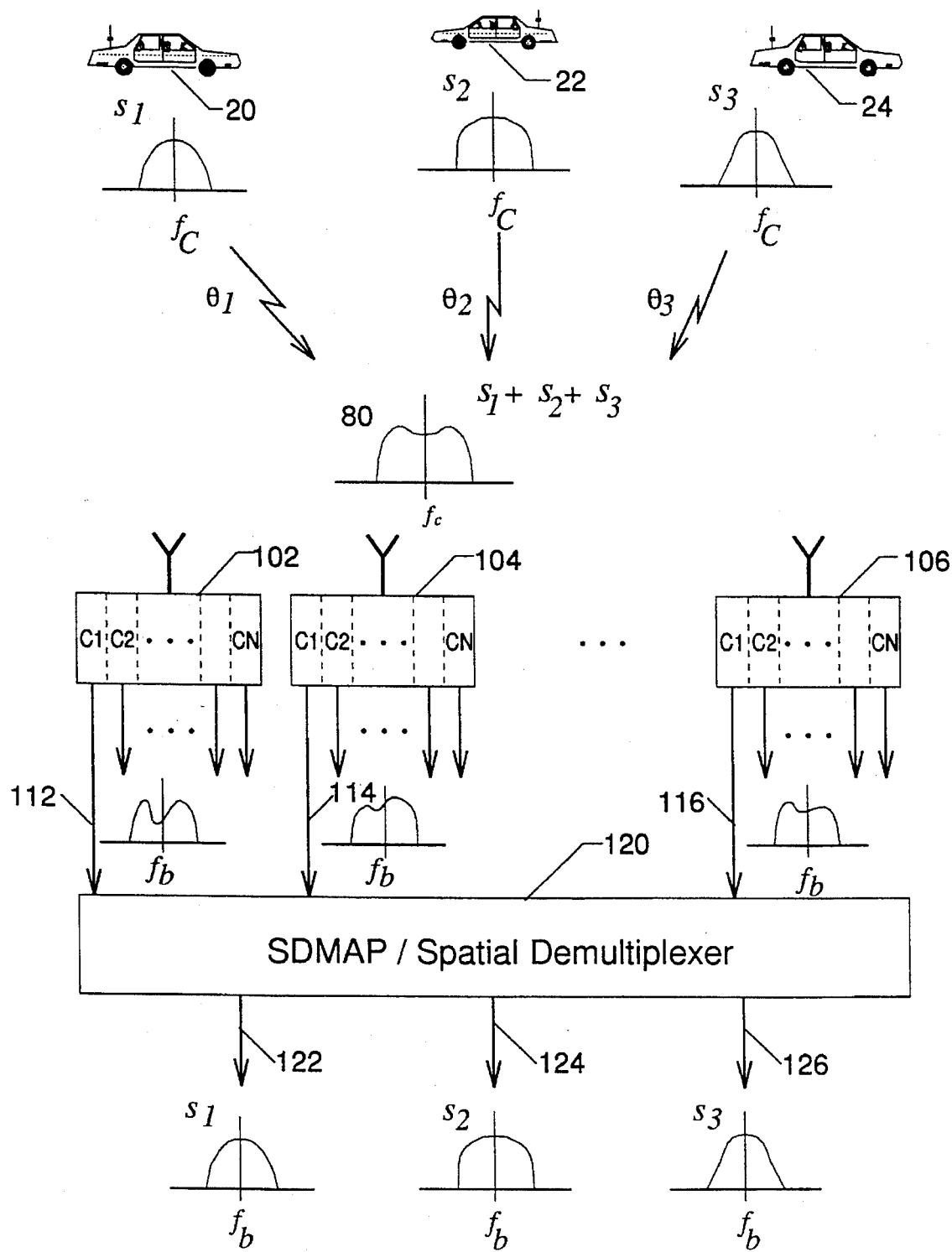
FIG. 7 is a breakdown of the SDMA multi-channel central site receiver in accordance with the invention.

The multichannel receiver takes an antenna input and has one output for each frequency channel which it is capable of processing. For example, in current analog cellular systems, the receiver consists of a bank of bandpass filters, one such filter tuned to each of the frequency channels assigned to that base station. In one embodiment of this invention, one such receiver is assigned to each antenna as shown in FIG. 7 (102,104,106). In another embodiment, several antennas are switched via a high-speed switching circuit to a single receiver. The output of the multichannel receivers for a particular (frequency) channel is a plurality of signals (112, 114,116), one signal from that channel for each antenna/ receiver pair. These signals are processed as a group by the SDMAP/Spatial Demultiplexer (120) so as to recover the original transmitted signals (122,124,126). Though the diagram implies that a single SDMAP and spatial demultiplexer is dedicated to each channel, in another embodiment several channels are multiplexed onto a single SDMAP and spatial demultiplexer.

Referring back to FIG. 4, in one embodiment, receiver outputs (44) are digitized after down-conversion to baseband in the multichannel receivers (42) and transmitted in digital form to SDMAPs (48) and spatial demultiplexers (46). The outputs of the spatial demultiplexers (50) are, in one embodiment, demodulated digitally and converted to analog for transmission through the switching network (58), and in another embodiment, converted to analog prior to demodulation. In yet another embodiment of this invention, A/D conversion of the analog receiver outputs (44) is performed in the SDMAPs, and analog receiver output (44) are sent to spatial demultiplexers (46) where digitally controlled analog weight-and-sum circuits spatially demultiplex the analog receiver outputs (44) and analog outputs (50) are sent to analog demodulators (52).

Generally, a function of the SDMAP (48) is to calculate appropriate control signals for the spatial demultiplexer (46) and spatial multiplexer (66) by processing the information received from multichannel receivers (42) and information provided by the SDMA controller (78). The SDMAP also sends tracking and other signal parameter information to the SDMA controller (72) for use in channel assignment and intelligent hand-off. A detailed description of the SDMAP is given below.

Spatial demultiplexers (46) demultiplex the outputs (44) of the multichannel receivers (42). This function is performed for each (frequency) receive channel assigned to the cell site. In one embodiment, in each channel, the signals (44) are appropriately combined by the spatial demultiplexer to provide one output for each signal present in that channel (C1 in FIG. 7). Herein, appropriately combined is defined to be combined so that the signal from each wireless unit in a channel appears at the appropriate output of the spatial demultiplexer. This is a unique aspect of this invention.

The outputs (50) of the spatial demultiplexer (46) for a particular channel are the separated signals transmitted from the wireless units to the base station in that channel, and are sent to demodulators as is done in current systems. The demodulated signals are then routed through a switching network (58) to their appropriate destination as is currently done.

Signals destined for the wireless units are obtained from the same switching network (58) and directed to signal modulators (62) as in done in current systems. Modulated baseband signals (64) are sent to spatial multiplexers (66) where they are appropriately processed as directed by the SDMAP (48) for transmission to the wireless units. In this illustration, these wireless units are assumed to be the same as those whose signals were received in the receivers (42). This need not be the case and is not a restriction of the current invention; they are herein the same for illustrative purposes only.

Figure 9:
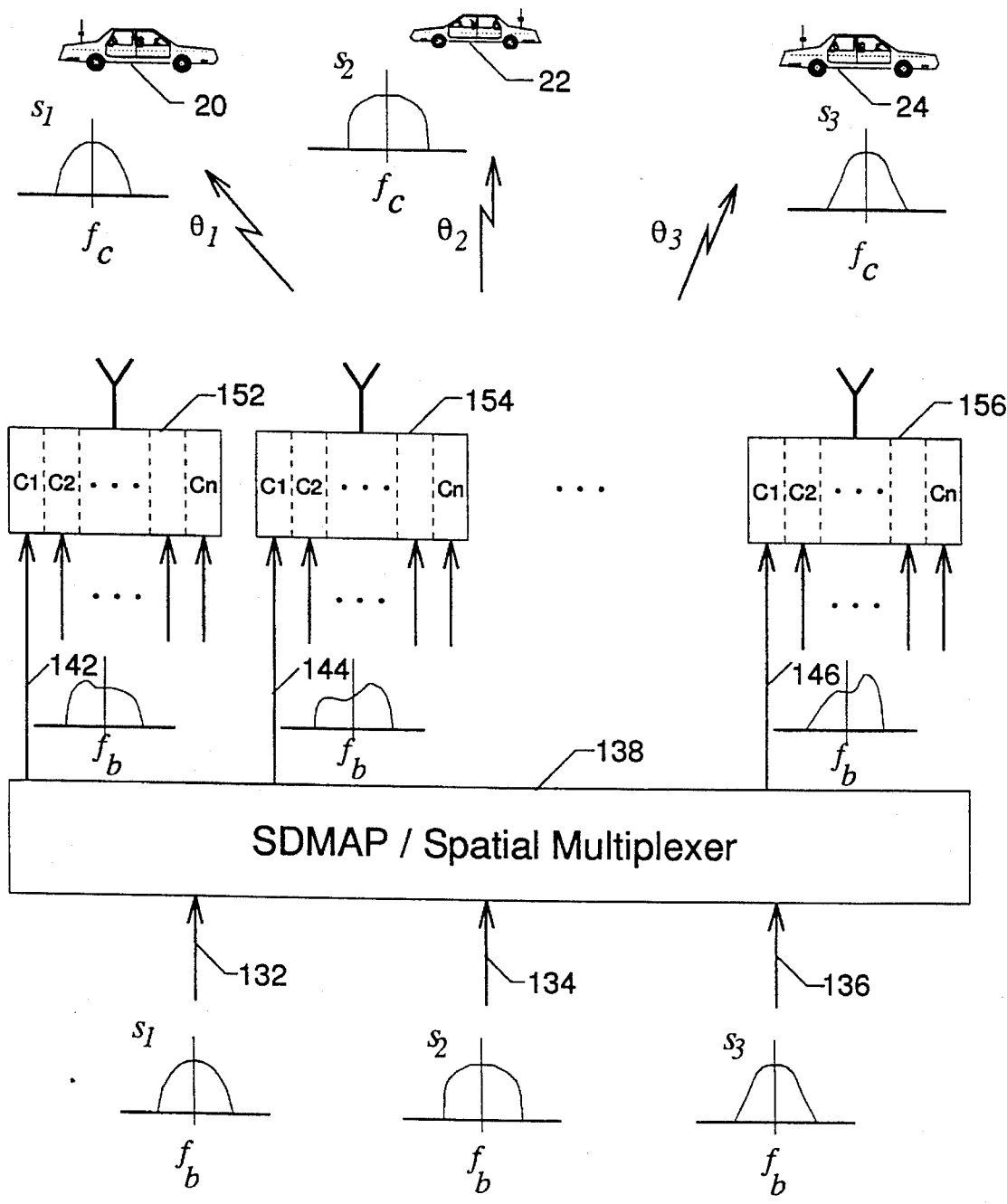
FIG. 9 is a breakdown of the SDMA multi-channel central site transmitter in accordance with the invention.

Multichannel transmitters (70) similar in structure to the receivers (42) are employed, there being one transmitter for each of the $m_{t_x}$ transmitting antennas as shown in FIG. 9 (152,154,156). Each transmitter appropriately combines the outputs of each channel assigned to the base station for the purpose of transmission of the signals through the associated antenna to the wireless units as in current systems.

The function of the SDMAP/Spatial multiplexer (138) shown in FIG. 9 is to multiplex one or more signals (132,134,136) into a particular channel (C1 in FIG. 9), but different spatial channels. The SDMAP/Spatial multiplexer (138) appropriately combines the signals (132,134,136) and provides one output for the particular channel (C1 in FIG. 9) in each transmitter (152,154,156). Herein, appropriately combined is defined to be combined so that each wireless unit receives only the signal intended for it. No other signals arrive at that particular wireless unit receiving in that (frequency) channel. This is a unique aspect of the invention.

Spatial multiplexing is performed for each channel (C1, C2, ..., Cn in FIG. 9). In one embodiment, a separate spatial multiplexer is provided for each channel. In another embodiment, the multiplexing task for several channels is performed by the same multiplexer hardware. If the signals (64) from the signal modulators (62) are analog, in one embodiment the spatial multiplexers (66) are composed of digitally controlled analog components. In another embodiment, the signals (62) are digitized if necessary, appropriately combined in the spatial multiplexers (66), then sent to the multichannel transmitters (70) for D/A conversion and transmission to the wireless units.

The Spatial Division Multiple Access Signal Processor (SDMAP)

Figure 5:
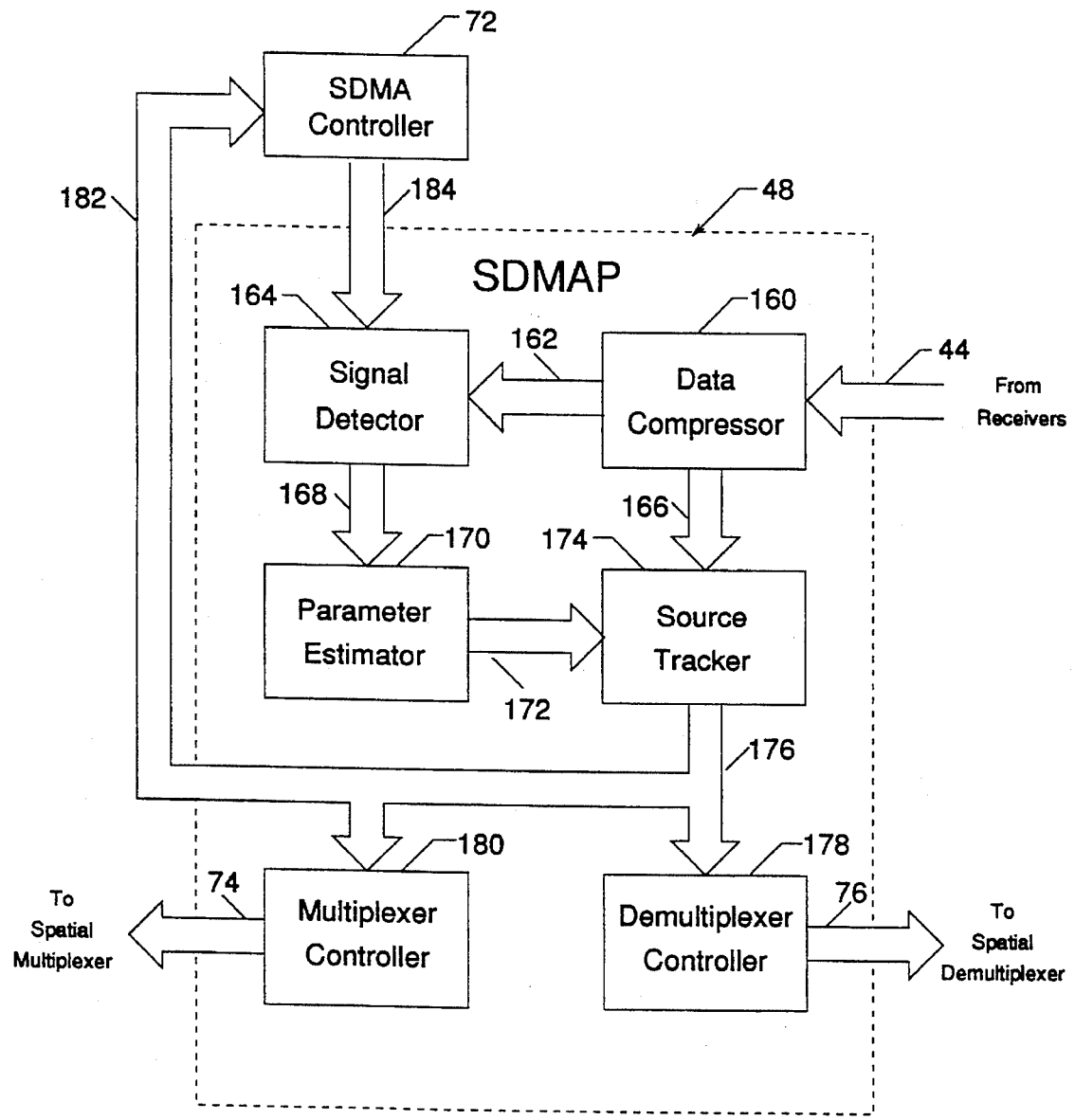
FIG. 5 is a breakdown of the SDMA signal processor (SDMAP) in accordance with the invention.

FIG. 5 shows a breakdown of a Spatial Division Multiple Access signal Processor (SDMAP) (48). The function of the SDMAP includes determining how many signals are present in a particular channel, estimating signal parameters such as the spatial location of the transmitters (i.e., directions-of-arrival DOAs and distance from the base station), and determining the appropriate spatial demultiplexing and multiplexing schemes. Inputs (44) to the SDMAP include outputs of base station receivers, one for each receiving antenna. In one embodiment, the receivers perform quadrature detection of the signals as in current systems in which case there are in-phase (I) and quadrature (Q) components (signals) output from each channel behind each antenna. In another embodiment, a single down-converted component, I or Q or any combination thereof, is used. In one embodiment, the receivers digitize the data before passing it to the SDMAP. In another embodiment, digitization is performed in the data compressor (160) as aforementioned.

In one embodiment of the invention, the SDMAP accomplishes its task by first obtaining estimates of important signal related parameters such as their directions-of-arrival (DOAs) without exploiting temporal properties of the signal. This is appropriate, for example, in situations where analog modulation schemes are employed and there is little is known about the signal waveform. In a second embodiment, known training sequences placed in digital data streams for the purpose of channel equalization can be used in conjunction with sensor array information to calculate signal parameter estimates such as DOAs and signal power levels. This information is then used to calculate appropriate weights (76) for a spatial demultiplexer implemented in this embodiment as a linear combiner, i.e., a weight-and-sum operation. In a third embodiment, TOA-related parameters from the parameter estimator are used in conjunction with signal correlation parameters to ascertain which signals are multipath versions of a common signal. Relative delays are then calculated such that the signals can be coherently combined, thus further increasing the quality of the estimated signals. The ability to exploit sensor array information in this manner is unique to this invention.

However, in another embodiment of this invention, the function of the spatial demultiplexer is performed in conjunction with the estimation of other source parameters such as the DOAs. As an example of one such embodiment of this type, the constant modulus property (i.e., constant amplitude) of various communication signals such as digital phase-shift-keyed (PSK) and analog FM waveforms can be exploited along with properties of the array of receiving antennas to simultaneously estimate the source waveforms as well as their DOAs using multichannel constant-modulus algorithms (CMA) which are well-known in the prior art.

In another embodiment, extended Kalman filters, also well-known in the prior art (C. Chui and C. Chen, Kalman Filtering with Real-Time Applications, Springer-Verlag, 1991), can be used to exploit these and similar properties. In these and similar embodiments, the function of the spatial demultiplexer (46) is assumed in the SDMAP (48), and the outputs of the SDMAP (76) are the spatially demultiplexed signals to be sent to the demodulators.

Referring again to FIG. 5, data compression (160) is performed to reduce the amount of data, and in one embodiment consists of accumulation of a sample covariance matrix involving sums of outer products of the sampled receiver outputs in a particular channel. Hereafter, these sampled outputs are referred to as data vectors, and there is one such data vector at each sample time for each of the channels assigned to a particular base station. In another embodiment, the compressed data are simply the unprocessed data vectors. If I and Q signals (44) are output from the receivers, each data vector is a collection of $m_r$ complex numbers, one for each of the $m_r$ receiver/antenna pairs. In a third embodiment, data compression also includes using known signal information such as training sequences present in wireless digital systems (D. Goodman, "Second Generation Wireless Information Networks," IEEE Trans. of Veh. Tech., Vol. 40, No. 2, May 1991) and mobile unit transponder responses in current analog systems to calculate time-of-arrival (TOA) of a distinct periodic signal feature, a parameter containing valuable information related to the distance between cell sites and the wireless transmitter which is exploited in this embodiment.

Compressed data (162) are passed to a signal detector (164) for detection of the number of signals present in the channel. In one embodiment, statistical detection schemes are employed in conjunction with information from a SDMA controller (72) to estimate the number of sources present in the channel. This information and the (compressed) data (168) are sent to a parameter estimator (170) where estimates of signal parameters including those related to the source locations (e.g., DOAs and range) are obtained.

Location-related parameter estimates (172) are passed to a source tracker (174). In one embodiment, the function of the source tracker is to keep track of the positions of each of the transmitters as a function of time. This is implemented by known nonlinear filtering techniques such as the aforementioned extended Kalman filter (EKF). In another embodiment, velocities and accelerations of each of the wireless units in a particular channel are tracked as well. Inputs to the EKF in one embodiment include the DOAs and TOAs from the local base station. In another embodiment, DOA and TOA measurements from other nearby cell sites also receiving transmissions from the mobile units are incorporated along with known locations of the cell sites to further improve the estimation accuracy of the EKF as is well-known in prior art. The tracker (174) outputs are sent along with the (compressed) data (176) to a spatial demultiplexer controller (178), to control the function of the spatial demultiplexer, and to a spatial multiplexer controller (180) to control the function of the spatial multiplexer.

SDMA Controller

Figure 10:
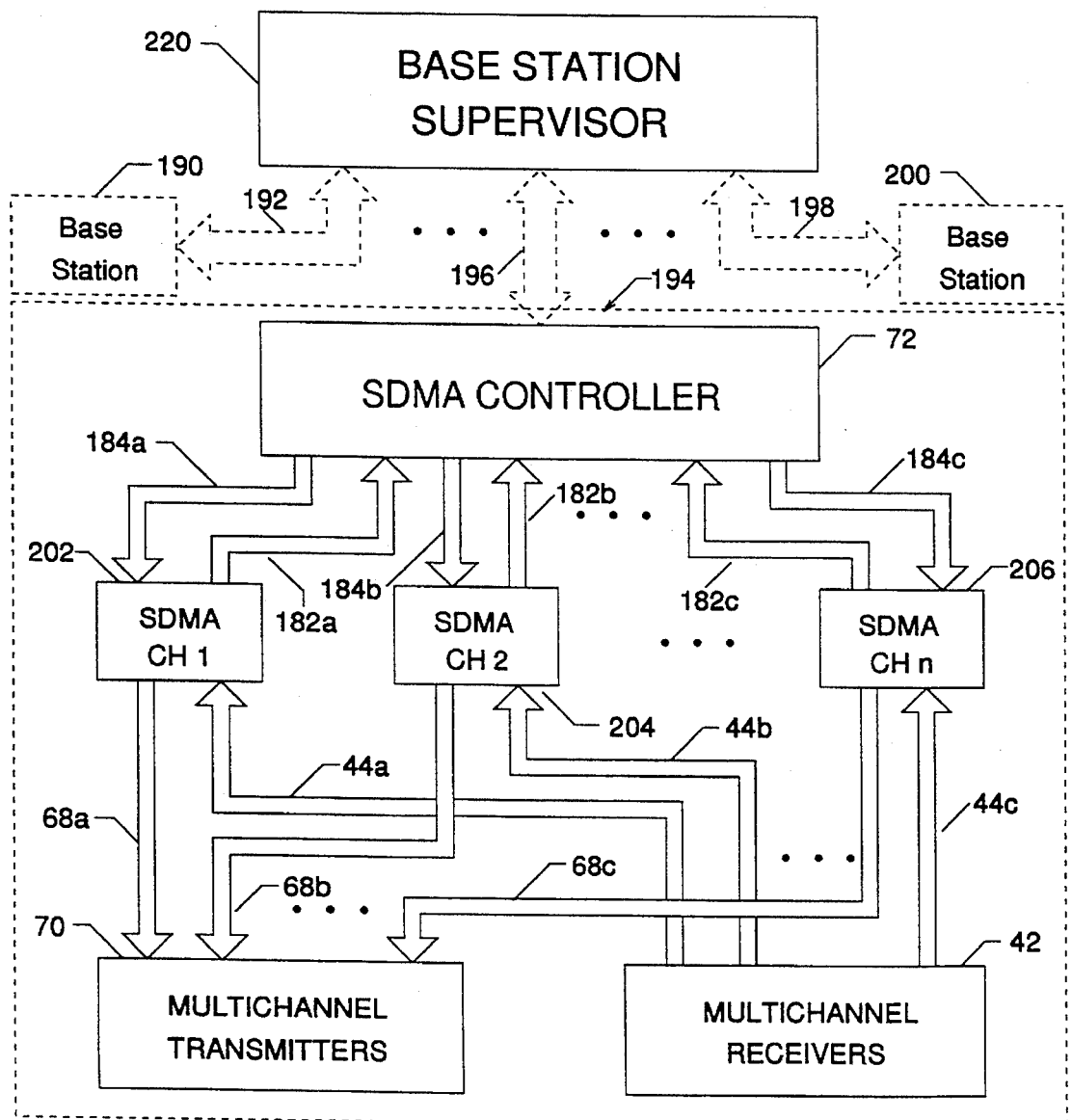
FIG. 10 is a graphic illustration of multiple SDMA processors employed to increase base station capacity in accordance with the invention.

FIG. 10 displays a SDMA controller (72) which supervises channel allocation, and a plurality of SDMA systems (202,204,206). As aforementioned, each SDMA system receives signals (44a,44b,44c) from the multichannel receivers (42) and sends signals (68a,68b,68c) to the multichannel transmitters (70) for transmission to the wireless units. The SDMA systems also communicate (tracking) information (182a,182b,182c) as aforementioned to the SDMA controller and receive information (182a,182b,182c) from the SDMA controller. Not shown in this illustration is a link between the base stations and their access to a wide area network through a switching network. Though such links are present in current cellular mobile networks and wireless LANs, they are certainly not required in this invention. Point-to-point communication between wireless units through the base station is possible without entering a wide area network.

The function of the SDMA system is performed for each channel (202,204,206), denoted CH 1, CH 2, . . . , CH n in FIG. 10, allocated to a base station for reception. In one embodiment, there is a separate SDMA system for each channel. In another embodiment, several channels are processed in the same SDMA system.

An objective of the SDMA controller (72) is to prevent wireless units from becoming coincident in (frequency or code) channel, time, and spatial (location) space. As required, the controller instructs the wireless units to change to different (frequency or code) channels via standard messaging schemes such as are present in current wireless systems.

In one embodiment, SDMA controllers at various cell sites (190,194,200) send tracking and frequency allocation information, in addition to other relevant source parameters such as signal power, concerning all the wireless units in their cell (192,196,198) to a base station supervisor (220). For example, in cellular mobile communications, the supervisor is the MTSO. This information is used to mitigate the aforementioned hand-off problems present in current wireless systems. With knowledge of the locations and velocities of all the transmitters and knowledge of the areas covered by each of the cell sites, efficient and reliable hand-off strategies can be implemented.

In another embodiment, the function of the SDMA controller includes relaying to each base station the locations and channel assignments of cars in neighboring cells. This information is used in the spatial multiplexer and demultiplexer controllers in the SDMAP to improve the performance of the spatial multiplexers and demultiplexers. Further improvements in capacity are also realized herein by allowing dynamic allocation of receive and transmit channels among the various cell sites and mobile units. The ability to track multiple transmitters in wireless communication networks and the significant improvements made with regard to system capacity and quality are unique to this invention.

Simulation Results

FIG. 11 illustrates the capability of the invention to simultaneously track multiple transmitters in the same channel, and to spatially demultiplex the received signals to estimate the transmitted waveforms individually. The receiving array is composed of a 10-element uniform linear array of elements spaced one half-wavelength apart, i.e., 17 cm at 850 MHz. The two FM transmitters are moving toward each other and actually cross paths, i.e., the DOAs are at one point during the interval the same. A severe Rayleigh fading environment is simulated with a fade rate in excess of 100 Hz. The receiver outputs are processed in blocks of 400 data vectors (0.05 sec of data sampled at 8 KHz). In spite of the fact that the transmitters are less than 2° apart at 1.7 sec, approximately 30 m separation 1 km from the base station, the individual signal waveforms are accurately reconstructed as shown in the lower illustration. This figure clearly manifests the efficacy of the invention as such performance has not been achieved in current systems. The ability to separate cochannel sources in close proximity to one another and to successfully spatially demultiplex the received signals is unique to this invention.

Figure 12:
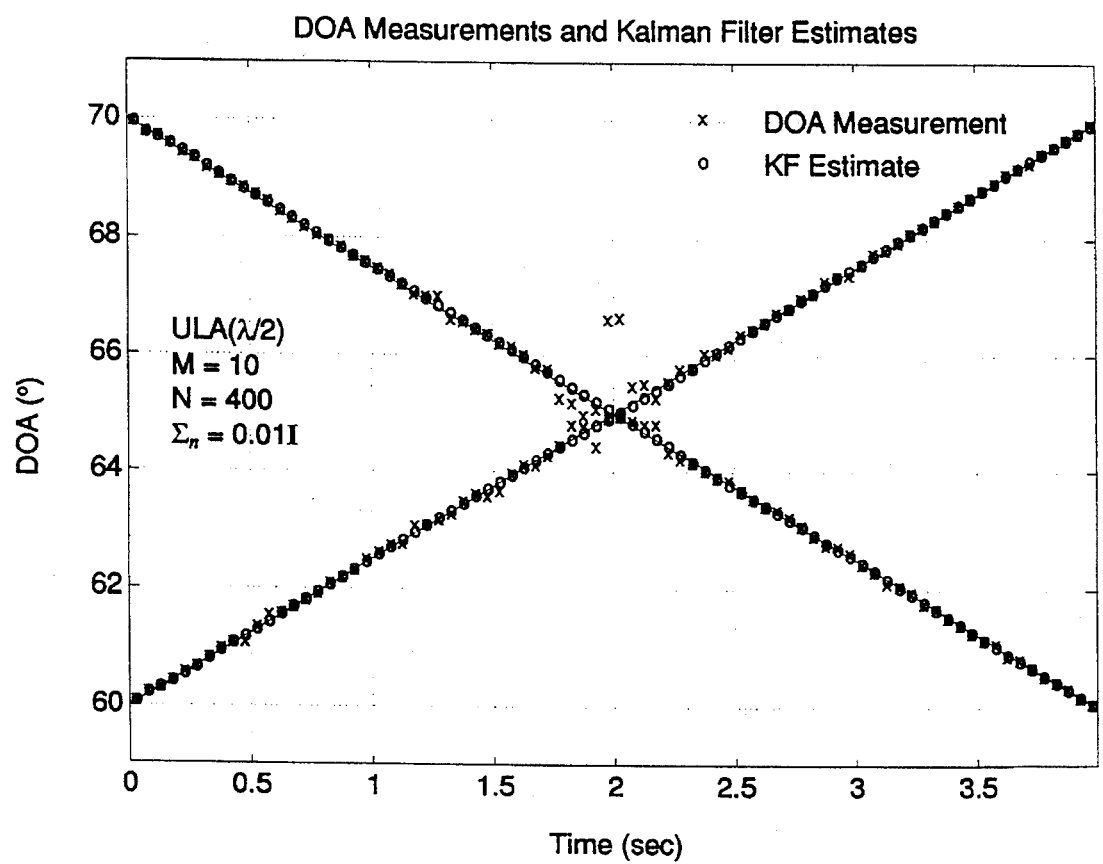
FIG. 12 illustrates DOA tracking of FM transmitters crossing tracks in a severe Rayleigh fading environment.
Figure 13C:
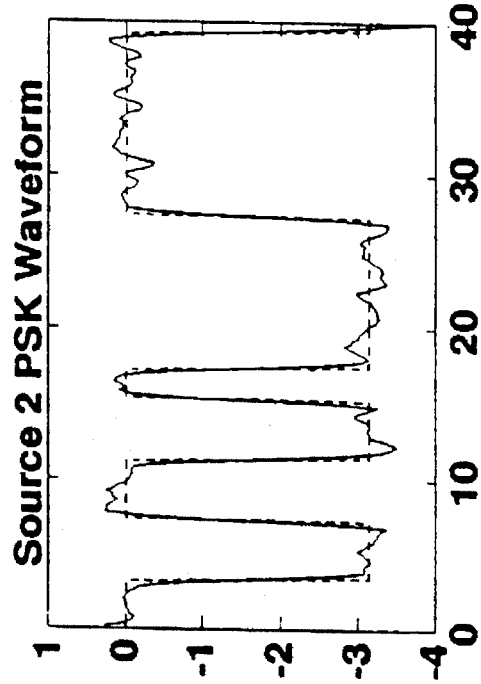
FIG. 13 illustrates the compatibility of the SDMA concept with proposed CDMA technology, successfully locating and spatially demultiplexing three spread-spectrum digital transmitters.
Figure 13E:
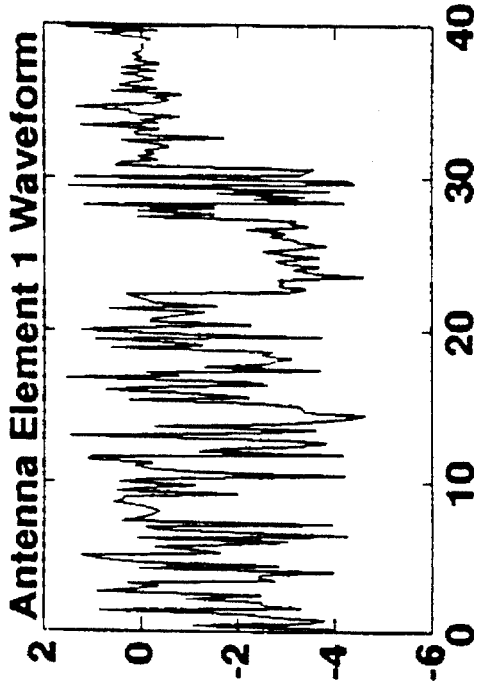
Figure 13B:
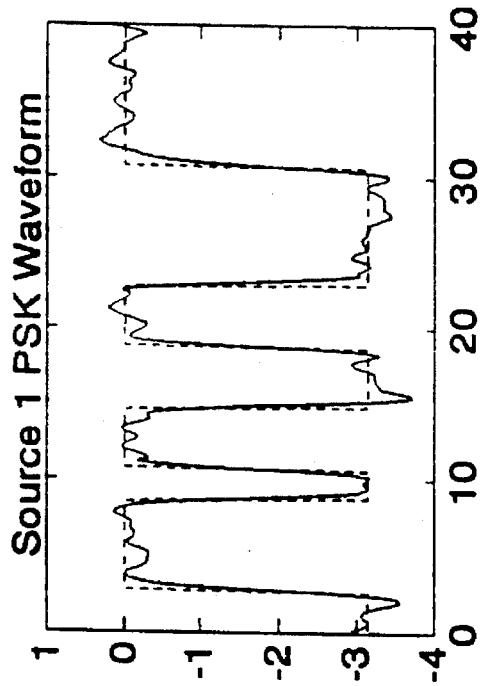
Figure 13D:
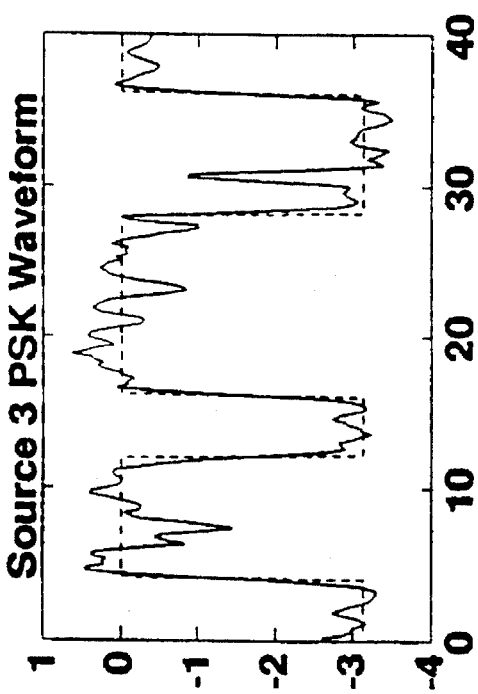

FIG. 12 is a continuation of FIG. 11 illustrating the capability of the invention to simultaneously track multiple transmitters in the same channel where the trajectories cross. At the midpoint of the estimation interval, the transmitters are at the same DOA. As is easily seen, the SDMA system tracks the DOAs of the transmitters successfully. The ability to track intersecting trajectories of cochannel transmitters from DOA measurements made by an array of sensors is unique to this invention and has not been accomplished in current wireless systems.

FIG. 13 illustrates the compatibility of the SDMA concept with proposed CDMA technology. Three sources at 20°, 40°, and 60° with respect to the line axis of a 10-element uniform linear array of omni-directional antenna elements are simulated. The baud-rate rates are 1 MHz, 1 MHz, and 500 KHz respectively, and the effective signal-to-noise ratio (SNR) is approximately 0 dB. The upper plot shows the output of the first antenna element, and the SNR is clearly seen to be nearly 0 dB, i.e., the signal and noise amplitudes are nearly equal. The lower four smaller plots show the three spatially demultiplexed signals and the angle of the output of the first antenna for comparison. They clearly indicate the ability of the SDMA system to not only spatially demultiplex the CDMA digital transmissions, but also indicate the performance improvement achievable. There is roughly a factor of 10 improvement in spatial demultiplexer output SNR as is quite evident. The DOA estimates were based on only 200 snapshots, and not only was the number of signals (three) correctly detected by the SDMA detector, the estimated DOAs were all within 0.5° of the true values. The capability to obtain estimates of such quality, and to spatially demultiplex spread-spectrum digital signals in these cochannel interfering environments is unique to this invention.

Figure 14:
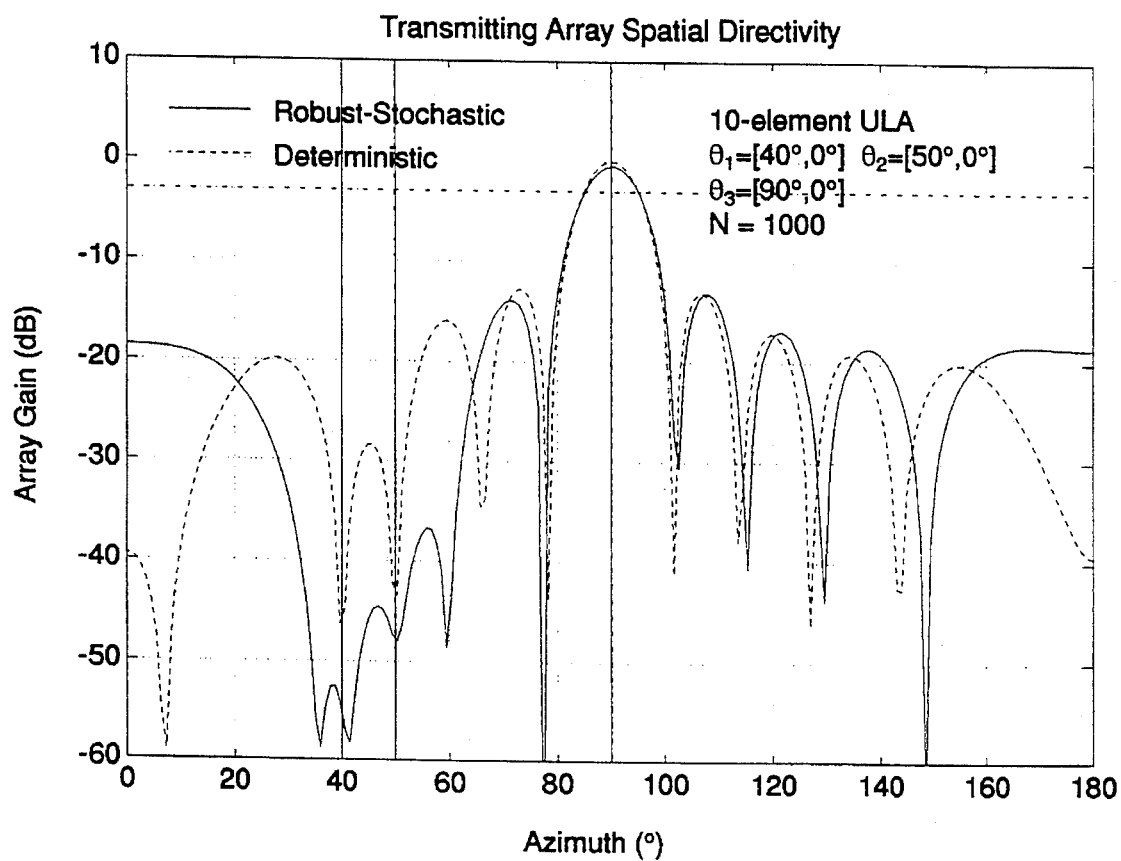
FIG. 14 illustrates the effectiveness of the robust SDMA spatial multiplexing scheme, unique to this invention, for directive transmission of signals to wireless receivers on the same frequency.

FIG. 14 illustrates the improvement of the SDMA robust spatial multiplexing scheme over conventional techniques. In the simulation, three transmitters were located at 40°, 50° and 90° respectively with respect to the line axis of a 10-element $\lambda/2$-spaced uniform linear array. The estimated directions of arrival based on 1000 data vectors were within 0.05° of the true values, and spatial multiplexing weight vectors were computed on the basis thereof. The illustration shows the results of spatial multiplexer design for transmission to the receiver at 90°; a design objective being the minimization of power in the direction of the receivers at 40° and 50°. The superiority of the SDMA robust spatial multiplexer over the conventional deterministic multiplexer which is prior art, is clearly manifest.

OPERATION OF THE INVENTION

Definitions

In the following discussion, the term base station is used to refer to a site with which (mobile) wireless units (herein termed users) communicate. Base stations are distinguished from wireless units only in that they often have dedicated and continuous access to a broadband wide area distribution network through which many signals can be transmitted simultaneously. This is not a restriction of the current invention as aforementioned. The term channel is used to denote any of the conventional channels (frequency, time, code) or any combination thereof. The term spatial channel refers to the new concept unique to the present invention.

Notation

Within the region served by a base station, users of the wireless system send signals to and receive signals from that base station. Denote the individual baseband user signals by $s_r(\omega_i, \theta_j^i, t)$ where $\omega_i$, i=1, . . . ,n, denotes the $i^{th}$ of n channels, and may denote, for example, a frequency channel in a FDMA system, a frequency-time slot in a FDMA/TDMA system, or a frequency channel and a code in a FDMA/CDMA system, $\theta_j^i$, j=1, . . . ,$d_i$, denotes the direction to the $j^{th}$ of $d_i$ users, using channel $\omega_i$, and t is a time index.

These baseband signals are the outputs of signal modulators which are appropriate for the modulation convention of the system as is done in current state-of-the-art. The inputs to these modulators are the messages users wish to send over the network. There is no restriction on the individual messages; they can be digital or analog, data or voice. These baseband signals are up-converted, e.g., used to modulate an RF carrier, and the resulting signals are broadcast by the users omni-directionally in the current state-of-the-art.

In the current state-of-the-art, a different channel, $\omega_i$, is allocated to each concurrent user on which they transmit signals to the base station. In current practice, a second channel is assigned for receiving information from the base station. As is current practice, when a user's requirement for the channels ceases, they are reassigned.

The signals in the various channels are simultaneously received by the base station and the function of the receiver is to demultiplex and down-convert the inputs to baseband signals, $s_r(\omega_1,t), \ldots, s_r(\omega_n,t)$. Such a receiver can be viewed as having one input and n outputs. A receiver that performs this function is herein referred to as a multichannel receiver. This is graphically illustrated in FIG. 1.

Analogously, the baseband signals which are transmitted from the base station to the users are denoted $s_{t_x}(\omega_i, \theta_j^i, t)$ where $\omega_i$, i=1, . . . ,n, denotes the $i^{th}$ of n channels, and may denote, for example, a frequency channel in a FDMA system, a frequency-time slot in a FDMA/TDMA system, or a frequency channel and a code in a FDMA/CDMA system, and $\theta_j^i$, j=1, . . . ,$d_i$, denotes the direction to the $j^{th}$ of $d_i$ users using channel $\omega_i$. The baseband signals in the various channels are inputs to the transmitter which up-converts and multiplexes the signals for transmission. Such a transmitter can be viewed as having n inputs and one output. A transmitter that performs this function is herein referred to as a multichannel transmitter. This is graphically illustrated in FIG. 1.

For the purposes of the ensuing discussion, the number of users sending information to the base station is assumed to be the number of users receiving information from the base station. This is not a requirement of the invention. Furthermore, the n channels allocated to a base station are, for illustrative purposes, assumed to be assigned in pairs, one for transmit and the other for receive. This is also not a requirement of the invention. In fact, in one embodiment of the invention, fewer base station receive (user transmit) channels are allocated in favor of more base station transmit (user receive) channels leading to a possible increase in system capacity for a fixed number of channels. The capability to achieve this increase in capacity is another unique aspect of the invention.

SDMA-The Invention

Consider a base station comprised of a collection of $m_r$ antennas for the reception of incoming signals. Such a collection is herein referred to as a receiving antenna array. Also available is a collection of $m_{t_x}$ antennas for signal transmission, herein referred to as a transmitting antenna array. In general, these are two physically different arrays with different configurations and different operating frequencies. However, in systems where reception and transmission need not occur simultaneously, the same array could serve as both the receiving and transmitting antenna array. Furthermore, the invention does not require transmission and reception to be on separate frequencies.

In this invention, multiple users can be allocated to each channel $\omega_i$. The $i^{th}$ output of the $k^{th}$ multichannel receiver (receiving the signal from the $k^{th}$ of $m_r$ antennas) has the following form:

$$x_k(\omega_i,t) = \sum_{j=1}^{d_i} a_k(\omega_i,\theta_j^i) s_r(\omega_i,\theta_j^i,t) + n_k^i(t), \tag{1}$$

where $a_k(\omega_i,\theta_j^i)$ is the gain and phase response of the $k^{th}$ antenna and multichannel receiver, for the $i^{th}$ channel to a signal arriving from $\theta_j^i$, and $n_k^i(t)$ is an unwanted noise term which incorporates imperfections in the antennae and receiving equipment, interfering sources, and noise.

Collecting the $i^{th}$ outputs of the $m_r$ multichannel receivers[1] (receiving the signals from the $m_r$ antennas) in a vector, the following equation is obtained:

$$x_r(\omega_i,t) = \sum_{j=1}^{d_i} a_r(\omega_i,\theta_j^i) s(\omega_i,\theta_j^i,t) + n^i(t) \tag{2}$$

[1] In a more general setting, the number of multichannel receivers can be reduced by switching the outputs of the antennas to a smaller number of multichannel receivers.

where $x_r(\omega_i,t) = [x_1(\omega_i,t), \ldots, x_{m_r}(\omega_i,t)]^T$, $a_r(\omega_i,\theta_j^i) = [a_1(\omega_i,\theta_j^i), \ldots, a_{m_r}(\omega_i,\theta_j^i)]^T$, $n^i(t) = [n_1^i(t), \ldots, n_{m_r}^i(t)]^T$.

The discussion above concerns the mathematical description of the signals received at the base station in the SDMA system. The equations describing transmission from the base station in the SDMA system have much the same structure. The transmitting array is composed of $m_{t_x}$ transmitting elements. The modulated signal input to the $k^{th}$ transmitter in a channel, $\omega_i$, is denoted $x_{t_x}^k(\omega_i,t)$. This signal enters the $k^{th}$ transmitter, is spatially multiplexed with the other channels, up-converted to the carrier frequency, and transmitted by the $k^{th}$ antenna. Due to transmitter and antenna characteristics, the baseband signal in channel $\omega_i$, as transmitted by the antenna is a function of the direction in which it is broadcast in the medium $$y_{t_x}^k(\omega_i,\theta,t) = a_{t_x}^{k*}(\omega_i,\theta) x_{t_x}^k(\omega_i,t), \tag{3}$$

where $a_{t_x}^k(\omega_i,\theta)$ denotes the gain and phase characteristics of the $k^{th}$ antenna and transmitter for the $i^{th}$ channel as a function of the direction $\theta$. Collecting the $i^{th}$ inputs to the $m_{t_x}$ transmitters (feeding the $m_{t_x}$ antennas) in a vector, and adding together the contributions from all the baseband signals in channel $\omega_i$, the following equation is obtained:

$$y_{t_x}(\omega_i,\theta,t) = \sum_{k=1}^{m_{t_x}} y_{t_x}^k(\omega_i,\theta,t) = a_{t_x}^*(\omega_i,\theta) x_{t_x}(\omega_i,t), \tag{4}$$

where $x_{t_x}(\omega_i,t) = [x_1(\omega_i,t), \ldots, x_{m_{t_x}}(\omega_i,t)]^T$, $a_{t_x}^T(\omega_i,\theta) = [a_1(\omega_i,\theta), \ldots, a_{m_{t_x}}(\omega_i,\theta)]$.

Different channels are from this stage treated separately. The same processing (cf. FIG. 4) takes place for each channel, $\omega_i$. Thus, the index i is suppressed in the following discussion, and equation (2) can be written as follows:

$$x_r(t) = \sum_{j=1}^{d} a_r(\theta_j)s_r(\theta_j,t) + n(t) = A_r s_r(t) + n(t), \quad (5)$$

where $A_r=[a_r(\theta_1) \ldots a_r(\theta_d)]$ and $s_r(t)=[s_r(\theta_1,t), \ldots ,s_r(\theta_d,t)]^T$, and equation (4) can be written as follows:

$$y_{t_x}(\theta,t)=a_{t_x}^*(\theta)x_{t_x}(t). \quad (6)$$

FIG. 4 shows a block diagram of the SDMA processor for one channel. The output of the receiver block (FIG. 4, 42 and FIG. 7, 102,104,106) is $x_r(t)$. This signal is an input to the Spatial Division Multiple Access signal Processor (SDMAP) (FIG. 5, 48).

A model of the vector of gain and phase characteristics for receive, $a_r(\theta)$, and transmit, $a_{t_x}^*(\theta)$ is assumed known for $\theta$ in the range of interest. The SDMAP exploits this information together with known properties of $s_r(\theta_j,t)$, e.g., training sequences and constant modulus properties, to:

1. appropriately compress the incoming data (FIG. 5, 160),
2. estimate the number of signals present in the channel (FIG. 5, 164),
3. estimate the directions-of-arrival (DOAs) of the incoming wavefronts and other signal parameters (FIG. 5, 170),
4. track the locations of the users in the channel (FIG. 5, 174),
5. estimate the spatial correlation structure of the received signals, $\epsilon\{s(t)s(t)^*\}$, (FIG. 5, 180).
6. compute an appropriate spatial demultiplexing scheme (FIG. 5, 180) based on the estimates above and information from the SDMA controller (FIG. 5, 72), and appropriately set the spatial demultiplexer (FIG. 5, 46, and FIG. 7, 46) so that individual incoming signals can be separated as shown in FIG. 6, 50, and
7. compute an appropriate spatial multiplexing scheme (FIG. 5, 180) based on the estimates above and information from the SDMA controller (FIG. 5, 72), and appropriately set the spatial multiplexer (FIG. 5, 66, and FIG. 9, 66) so that the multiple transmitted signals do not interfere with each other at the intented receive sites as shown in FIG. 8.

The spatial demultiplexer (FIG. 4, 46) takes as input the output of the receivers, $x_r(t)$ and the demultiplexing scheme computed in the SDMAP. The multichannel output of the demultiplexer contains an estimate of the baseband signals of the d spatial channels $\hat{s}_r(\theta_j,t)$, $j=1, \ldots ,d$, obtained by combining the receiver outputs in an appropriate manner to pass the desired signal while coherently cancelling undesired users in the same channel. Furthermore, the relative amount of background noise is decreased in the spatial multiplexer, thus enhancing output signal quality compared to prior art. The individual baseband signals are passed on to standard signal demodulators, (FIG. 4, 52) which demodulate and equalize the messages as in done in the current state-of-the-art.

The spatial demultiplexer is implemented either in analog or digital hardware. In an analog embodiment, the analog-to-digital (A/D) conversion takes place in the SDMAP, and in the digital embodiment, the A/D conversion takes place in the receivers. The spatial demultiplexing is performed either in analog or digitally, and the appropriate A/D or D/A conversion of the baseband signals takes place to interface with the signal demodulators.

The spatial multiplexer (FIG. 4, 66) takes as input the baseband message signals from the signal modulators (FIG. 4, 62) and the multiplexing scheme computed in the SDMAP (48). The multichannel output is spatially multiplexed so that when temporally multiplexed, up-converted, and transmitted through the transmitting array, the message intended for the user in direction $\theta_j$ is:

1. coherently added in the direction of $\theta_j$,
2. coherently cancelled in the directions of the other users of the same channel, and
3. minimized in all other directions.

The spatial multiplexer does the above simultaneously for all spatial channels, $\theta_j$, $j=1, \ldots ,d$. Thus, $y_{t_x}(\theta,t)$ in equation (6) is equal to $s_{t_x}(\theta_j,t)$ for $\theta=\theta_j$, $j=1, \ldots ,d$ by appropriate choice of multiplexing scheme when forming $x_{t_x}(t)$.

The spatial multiplexer can be implemented using either analog or digital techniques. Appropriate A/D and D/A conversion of the input/output is performed to interface with the signal modulator and transmitters.

Details of a Particular Instantiation of the SDMA Invention

To exemplify the SDMA procedure, detailed examples of the different steps taken are given below.

Data Compression

In one embodiment, data compression is accomplished by forming a covariance matrix from the received data $$\hat{R} = \frac{1}{N} \sum_{k=1}^{N} x(t_k)x^*(t_k), \quad (7)$$

Where N is the number of data vectors (or snapshots), $x(t_k)$, used. Spatial smoothing and/or forward-backward averaging, both well-known in prior art, are performed as appropriate. These operations can be mathematically described by a transformation of $\hat{R}$ given by:

$$\hat{R}_T = J\hat{R}J^*. \quad (8)$$

The signal and noise subspaces, $E_s$ and $E_n$, are calculated using well-known mathematical techniques such as eigendecompositions (EVDs) and singular-value decompositions (SVDs)

$$\Sigma_n^{-1/2}\hat{R}_T\Sigma_n^{-*/2} = \sum_{k=1}^{m_r} \lambda_k e_k e_k^* = E_s\Lambda_s E_s^* + E_n\Lambda_n E_n^*, \quad (9)$$

where $$\Sigma_n = JJ^* \quad (10)$$

$$E_s = [e_1, \ldots ,e_d] \quad (11)$$

$$\Lambda_s = \text{diag}[\lambda_1, \ldots ,\lambda_d] \quad (12)$$

$$E_n = [e_{d+1}, \ldots ,e_{m_r}] \quad (13)$$

$$\Lambda_n = \text{diag}[\lambda_{d+1}, \ldots ,\lambda_{m_r}]. \quad (14)$$

These equations describe the processing of a block of data, i.e., batch mode. Alternatively, the data can be recursively processed with the quantities above updated as new data become available. Such techniques are well-known in prior art.

Signal Detector

In one embodiment, signal detection is accomplished using statistical criteria such as Minimum Description Length (MDL), An Information Criterion (AIC), or Weighted Subspace Fitting (WSF) detection, all well-known in prior art. Information from the SDMA controller pertaining to the number of sources locally assigned to that particular channel is also used in the detector to set a lower bound on the estimated number of signals present.

Signal Parameter Estimator

In one embodiment, a Maximum Likelihood estimator is employed to obtain the signal parameter estimates, $\hat{\theta}$, the emitter signal covariance estimate, $\hat{S}$, and the noise variance estimate, $\hat{\sigma}^2$. These are obtained minimizing the following cost function $$V(\theta,S,\sigma^2)=\log |R|+N\, Tr\{R^{-1}\hat{R}_T\} \quad (15)$$

$$R=JA(\theta)SA^*(\theta)J^*+\sigma^2 JJ^* \quad (16)$$

Techniques for performing the minimization are well-known in prior art. In other embodiments, algorithms making use of signal and noise subspaces may be used to estimate the signal parameters.

Source Tracker

In one embodiment, an extended Kalman filter (EKF) takes DOA estimates from the DOA estimator as inputs, and outputs estimates of the kinematic state of the transmitter, i.e., its position and velocity as a function of time. Such filters are well-known in prior art (Chui, op. cit.). In another embodiment, DOA estimates from a plurality of base stations receiving signals from a plurality of users are processed in an EKF in the SDMA controller to obtain location estimates of the users and the location estimates are communicated back to the base stations by the SDMA controller. In yet another embodiment, time-of-arrival (TOA) information obtained at the base stations from known signal properties using techniques well-known in the current state-of-the-art and as described previously, is used in addition to DOA estimates to estimate the user locations. In general, the embodiment which exploits all the information available related to the location of the transmitter is to be preferred. The capability to locate users using such measurements made at base stations is unique to this invention.

Demultiplexer Controller

In one embodiment, an appropriate collection of weights $W_r=[w_r(\theta_1) \ldots w_r(\theta_d)]$ is calculated, one set, $w_r(\theta_k)$, for each signal, $s_r(\theta_k,t)$, to be demultiplexed. The calculation of the appropriate weights in this embodiment involves noise covariance and signal correlation estimation from which robust structured-stochastic signal copy weights are calculated as follows:

$$W=hd\ r=(A\hat{S}A^*+\hat{\sigma}^2 I+D(\Sigma_{CRB}\odot\hat{S})D^*)^{-1}(A\hat{S}+D'(\Sigma_{CRB}\odot\hat{S}). \quad (17)$$

where $$A=A(\hat{\theta}) \quad (18)$$

$$\hat{S}=(A^*(\hat{\theta})A(\hat{\theta}))^{-1}A^*(\hat{\theta})(\hat{R}-\hat{\sigma}^2 I)\, A(\hat{\theta})(A^*(\hat{\theta})A(\hat{\theta}))^{-1} \quad (19)$$

$$\hat{\sigma}^2=\frac{1}{m-d}\, Tr\{(I-A(\hat{\theta})\,(A^*(\hat{\theta})A(\hat{\theta}))^{-1}A^*(\hat{\theta}))\hat{R}\} \quad (20)$$

$$D=\left[\frac{\partial a(\theta_1)}{\partial \theta},\ldots,\frac{\partial a(\theta_d)}{\partial \theta}\right] \quad (21)$$

$$D'=\left[\frac{\partial^2 a(\theta_1)}{\partial \theta^2},\ldots,\frac{\partial^2 a(\theta_d)}{\partial \theta^2}\right] \quad (22)$$

$$\Sigma_{CRB}=\text{Cramér-Rao bound on } \theta \quad (23)$$

and $\odot$ denotes element-wise multiplication.

Multiplexer Controller

In one embodiment, the same mathematical formulae used by the demultiplexer controller to calculate the demultiplexing weights, are used to calculate the appropriate collection of multiplexing weights, $W_{t_x}=[w_{t_x}(\theta_1)\ldots w_{t_x}(\theta_d)]$. In each set, $w_{t_x}(\theta_k)$, a weight, $w_{t_x}^k(\theta_k)$, $k=1,\ldots,m_{t_x}$, is computed for each of the $m_{t_x}$ transmitting antennas. One set of weights is computed for each signal to be transmitted.

Demultiplexer

In one embodiment, the spatial demultiplexing of signal $s_r(\theta_k,t)$ is achieved by multiplying the output of the receivers, $x_r(t)$, by the appropriate weight, $w_r(\theta_k)$, then obtaining their sum $$s_r(t)=W_r^* x_r(t). \quad (24)$$

This process is hereafter referred to as signal copy.

Multiplexer

In one embodiment, the spatial multiplexing of the transmission signals, $s_{t_x}(\theta_k,t)$, is achieved by multiplying the individual signals, $s_{t_x}(\theta_k,t)$, by the appropriate set of multiplexing weights, $w_{t_x}(\theta_k)$. The resulting spatially modulated signal has the form $$x_{t_x}(t)=W_{t_x}s_{t_x}(t) \quad (25)$$

where $s_{t_x}(t)=[s_{t_x}(\theta_1,t),\ldots,s_{t_x}(\theta_d,t)]^T$.

SDMA controller (72)

A function of SDMA controller is to prevent wireless units from becoming coincident in (frequency or code) channel, time, and spatial (location) space. As required, the controller instructs the wireless units to change to different (frequency or code) channels via standard messaging schemes present in current state-of-the-art wireless systems. In one embodiment, this is performed by calculating a weighted measure of the proximity of all users in the cell. Pairwise user spatial location separations (i.e., DOA differences) are weighted inversely proportional to the maximum receiving antenna array beamwidth at the two DOAs, and the frequency difference measure is binary-valued, taking the value 1 if the frequencies are different and 0 if they are the same.

Denoting the channel assigned to user i by $\omega_i$, its DOA by $\theta_i(t)$, and the array beamwidth at DOA i by $\theta_i^{BW}(t)$, a distance measure $D_{ij}(t)$ can be written as follows:

$$D_{ij}(t)=\frac{|\theta_i(t)-\theta_j(t)|}{max\{\theta_i^{BW}(t),\theta_j^{BW}(t)\}}+(1-\delta(\omega_i,\omega_j))\gamma, \quad (26)$$

where $\delta(\omega_i,\omega_j)$ is 1 if $\omega_i=\omega_j$ and 0 if $\omega_i\neq\omega_j$. When $D_{ij}(t)<\gamma$ for any pair of users $\{i,j\}$, where $\gamma$ in one embodiment is a fixed constant near unity, a frequency reallocation is performed by finding $$\max_{i,j,k}\ \{max(D_{ik}(t_s),D_{kj}(t_s))\}, \quad (27)$$

where $t_s$ is the time at which $D_{ij}(t)<\gamma$. That is, the value of k that maximizes the new distance measure is selected and the appropriate user, either i or j, is switched to channel $\omega_k$ for transmitting to the base station. This same algorithm is employed to select channels in which base stations transmit to users by simply replacing receive antenna array parameters with transmit antenna array parameters in equation 27. In another embodiment, signal strength and direction of travel are used to develop more robust switching strategies. In even more sophisticated embodiments, a similar optimization is performed using information from a plurality of base stations at a base station supervisor to allocate transmit and receive channels among the multiple base stations and multiple users comprising the wireless system.

Thus, it is clear to see that the present invention is a method and apparatus for increasing capacity and improving quality of wireless communication networks. The locations of multiple sources simultaneously transmitting information in a common channel can be estimated and the individual signal waveforms reconstructed. Information is simultaneously transmitted to the sources on a common channel without creating cochannel interference which would otherwise compromise two-way (full-duplex) communication links. Furthermore, the invention provides for tracking of mobile sources, mitigating the hand-off and signal management problems and is compatible with current and future modulation schemes in wireless communication systems.

While the above description contains certain specificities, these should not be construed as limitations on the scope of the invention, but rather as an exemplification of one preferred embodiment and application thereof. Many other variations are possible. For example, the system can:

1. be used to monitor the quality of service provided by proposed cell site locations,
2. be used to increase security by transmitting signals only in preferred directions, thereby also limiting the amount of undesired radiation,
3. be implemented on mobile units, thereby endowing the mobile units with many of the aforementioned advantages, and additionally providing the capability for point-to-point service where mobile units transmit and receive directionally to and from each other.

Accordingly, the scope of the invention should not be determined by the embodiments illustrated, but by the appended claims and their legal equivalents.

What is claimed is:

1. A wireless system including a base station for receiving uplink signals transmitted by users at different spatial locations comprising:
   receiving means including a plurality of receiving antennas at said base station for detecting combinations of arriving signals from said users, said receiving means further comprising plural multichannel receivers for obtaining said combinations of arriving signals from said receiving antennas for plural uplink channels from said users, each multichannel receiver having one channel for each uplink channel;
   processing means at said base station for processing said combinations of arriving signals, said processing means including means for determining a number of arriving signals in each of said uplink channels by employing statistical methods using eigenvalues of a covariance matrix calculated using said combinations of arriving signals,
   means for obtaining said parameters of said arriving signals including directions of arrival of said arriving signals,
   means for tracking user parameters including locations of said users from said parameters and said combinations of arriving signals, and
   spatial demultiplexing means for obtaining estimates of each of said uplink signals from said combinations of arriving signals and said parameters of arriving signals and said user parameters.

2. The wireless system as defined by claim 1 wherein said spatial demultiplexing means for obtaining said estimates of said uplink signals comprises:
   means for using said parameters of arriving signals and said user parameters and said combinations of arriving signals from said receiving antennas in each of said uplink channels for obtaining said arriving signals,
   means for associating said arriving signals in each of said uplink channels with said users in each of said uplink channels, and
   means for combining said arriving signals in each of said uplink channels associated with each of said users in each of said uplink channels to obtain said estimates of said uplink signals.

3. The wireless system as defined by claim 1 wherein said base station is one of a plurality of base stations, and further including
   means for assigning each user to one of said uplink channels, and
   means for selecting, at least one of said base stations for spatially demultiplexing said combinations of arriving signals to obtain transmitted uplink signals in said uplink channels.

4. A wireless system for communication of downlink signals from a base station in downlink channels to users at locations remote from said base station, said wireless system comprising:
   spatial multiplexing means for combining downlink signals to be transmitted from said base station in downlink channels to said users, and
   transmitting means having an input connected to said spatial multiplexing means for transmitting the combined downlink signals and including plural transmitting antennas and multichannel transmitters with one multichannel transmitter for each transmitting antenna and with one channel of each of said multichannel transmitters for each of said downlink channels,
   whereby said downlink signals are transmitted to said users in a spatially selective manner.

5. A wireless system for communication of downlink signals from a base station to users at locations remote from said base station, said wireless system comprising:
   spatial multiplexing means for combining downlink signals to be transmitted from said base station in downlink channels to said users, and
   transmitting means having an input connected to said spatial multiplexing means for transmitting the combined downlink signals and including plural transmitting antennas and multichannel transmitters with one multichannel transmitter for each transmitting antenna and with one channel of each of said multichannel transmitters for each of said downlink channels,
   whereby said downlink signals are transmitted to said users in a spatially selective manner and,
   wherein said base station is one of a plurality of base stations, and wherein said spatial multiplexing means comprises:
      means for selecting at least one base station from said plurality of base stations for transmission of each of said downlink signals to each user,
      said spatial multiplexing means including means for combining said downlink signals for each of said downlink channels for each of said transmitting antennas at said selected at least one base station.

6. The wireless system as defined by claim 5 and further including:
   means for assigning each of said users to a downlink channel.

7. A wireless system for full duplex communication of downlink signals and uplink signals between a base station and users physically remote from said base station, said wireless system comprising:
   receiving means at said base station for detecting combinations of arriving signals from said users in said uplink channel and including a plurality of receiving antennas and multichannel receivers with on multichannel receiver for each of said receiving antennas, each channel of each of said multichannel receivers dedicated to an uplink channel, processing means for processing said combinations of arriving signals in each uplink channel, said processing means comprising:

means for determining the number of arriving signals in each of said uplink channels by employing statistical methods using eigenvalues of a covariance matrix calculated using said combinations of arriving signals, means for obtaining parameters of said arriving signals including directions of arrival of said arriving signals, and means for tracking user parameters including locations of said users from said parameters and said combinations of arriving signals, spatial demultiplexing means for obtaining estimates of the uplink signals in each uplink channel from said combinations of arriving signals and said parameters of arriving signals and said user parameters, spatial multiplexing means using said parameters of arriving signals and said user parameters for combining downlink signals from said base station to said users in at least one downlink channel, and transmitting means having an input connected to said spatial multiplexing means for transmitting the combined downlink signals and including a plurality of transmitting antennas and multichannel transmitters with one multichannel transmitter for each of said transmitting antennas, one channel of said multichannel transmitters dedicated to a downlink channel and to the spatial transmission of said downlink signals to said users in said at least one downlink channel, whereby reception of multiple uplink signals in multiple uplink channels from said users and transmission of multiple downlink signals in multiple downlink channels to said users can occur simultaneously.

8. The wireless system as defined by claim 7 wherein said spatial demultiplexing means comprise:

means for using said parameters and said combinations of arriving signals from said receiving antennas in each of said uplink channels for reducing channel interference and noise, means for associating said arriving signals in each of said uplink channels with said users in each of said uplink channels, and means for combining said arriving signals in each of said uplink channels associated with each of said users in each of said uplink channels to obtain said estimates of said uplink signals.

9. The wireless system as defined by claim 7 wherein said base station is one of a plurality of base stations, and further including means for selecting at least one base station from said plurality of base stations for transmission of each of said downlink signals to each user, said spatial multiplexing means including means for combining said downlink signals for each of said downlink channels and for each of said transmitting antennas at said selected at least one base station.

10. The wireless system as defined by claim 7 wherein said base station is one of a plurality of base stations, and further including means for assigning each of said users to an uplink channel, and means for selecting at least one of said base stations for spatially demultiplexing said measurements to obtain said estimates of said uplink signals in said uplink channel.

11. The wireless system as defined by claim 7 wherein said base station is one of a plurality of base stations, and further including means for assigning each of said users to a downlink channel, and means for selecting at least one of said base stations for transmitting each of said downlink signals to each of said users in an assigned downlink channel.

* * * * *